(12) United States Patent
Zhang et al.

(10) Patent No.: US 10,976,164 B2
(45) Date of Patent: Apr. 13, 2021

(54) METHODS AND SYSTEMS FOR ROUTE GENERATION THROUGH AN AREA

(71) Applicant: HERE GLOBAL B.V., Eindhoven (NL)

(72) Inventors: Zhenhua Zhang, Chicago, IL (US); Leon Stenneth, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 285 days.

(21) Appl. No.: 16/218,020

(22) Filed: Dec. 12, 2018

(65) Prior Publication Data
US 2020/0191576 A1    Jun. 18, 2020

(51) Int. Cl.
   G01C 21/32    (2006.01)
   G06F 16/29    (2019.01)
   G01C 21/34    (2006.01)

(52) U.S. Cl.
   CPC ......... *G01C 21/32* (2013.01); *G01C 21/3461* (2013.01); *G06F 16/29* (2019.01)

(58) Field of Classification Search
   CPC ...... G01C 21/32; G01C 21/3461; G06F 16/29
   See application file for complete search history.

(56) References Cited

U.S. PATENT DOCUMENTS

| | | | |
|---|---|---|---|
| 9,195,914 B2 | 11/2015 | Fairfield et al. | |
| 9,626,571 B2 | 4/2017 | Spangenberg | |
| 10,042,359 B1 | 8/2018 | Konrardy et al. | |
| 2016/0046290 A1 | 2/2016 | Aharony et al. | |
| 2017/0010115 A1 | 1/2017 | Stein et al. | |
| 2019/0384294 A1* | 12/2019 | Shashua | ............... G05D 1/0088 |

FOREIGN PATENT DOCUMENTS

| | | | |
|---|---|---|---|
| EP | 2267676 A1 | 12/2010 | |
| FR | 3061886 A1 | 7/2018 | |
| WO | 2011157251 A1 | 12/2011 | |
| WO | 2014168944 A1 | 10/2014 | |
| WO | 2017144319 A1 | 8/2017 | |

OTHER PUBLICATIONS

Krumm et al., "Map Matching with Travel Time Constraints", Jan. 2006, 11 pages.
Abramov et al., "A Flexible Modeling Approach for Robust Multi-lane Road Estimation", Jun. 6, 2017, 7 pages.
Office Action for related European Patent Application No. 19214983.9-1001, dated May 13, 2020, 10 pages.

* cited by examiner

*Primary Examiner* — Michael D Lang
(74) *Attorney, Agent, or Firm* — Ditthavong, Steiner & Mlotkowski

(57) ABSTRACT

A method, a system, and a computer program product are provided for generating route data of one or more routes through an area. The method includes obtaining from a map database, a plurality of map-matched links corresponding to area and determining one or more first links and one or more second links from the plurality of map-matched links. The method further includes searching the map database, in the downstream of each of the first links for one or more missing downstream links and searching the map database in the upstream of each of the second links for one or more missing upstream links, and generating the route data of the routes based on the first link, the second link, the missing downstream links, the missing upstream links, and the plurality of map-matched links.

20 Claims, 12 Drawing Sheets

| Symbol name | Description |
|---|---|
| Link ID ($t$) | The unique ID for links (eg. 1439848170), Links are defined as the road segment between designated start and end locations. |
| Link Start Location ($p$) | Latitude and Longitude of end node based on WGS84 (e.g. 48.55393 and 12.01813) and symbolled as $plat$ and $plon$, respectively |
| Link End Location ($q$) | Latitude and Longitude of start node based on WGS84 (e.g. 48.55393 and 12.01813) and symbolled as $qlat$ and $qlon$, respectively |
| Link Upstream Heading ($u$) | The heading of the start location of the link, measured as the heading of the vector formed by the link start and its nearest shape location |
| Link Downstream Heading ($w$) | The heading of the end location of the link, measured as the heading of the vector formed by the link end and its nearest shape location |
| Link Shape Location ([ $s_i$ ]) | A set of shape locations for the links excluding start and end locations: in [$s_i$] . $i$ is the sequence number for the shape locations. The number is equal to 1 if the shape location closest to the start node of the link and it increases as the shape location is farther away from the start node. |
| Link Length ($l$) | The total length of the link |

FIG. 6B

|  | $t_1$ | $t_2$ | $t_3$ | $t_4$ | $t_5$ |
|---|---|---|---|---|---|
| $t_1$ | / | 1 | 1 | 0 | 0 |
| $t_2$ | 0 | / | 0 | 0 | 0 |
| $t_3$ | 0 | 0 | / | 0 | 0 |
| $t_4$ | 0 | 0 | 0 | / | 1 |
| $t_5$ | 0 | 0 | 0 | 0 | / |

METHODS AND SYSTEMS FOR ROUTE GENERATION THROUGH AN AREA

TECHNOLOGICAL FIELD

The present disclosure generally relates to generating one or more routes through an identified area in a geographical region, and more particularly relates to generating route data of the routes through the area.

BACKGROUND

Road works or roadwork zones are typically found on a section of a road, an entire road, or a sequence of roads that are occupied for the purpose of, for example, road surface repairs, work on power lines, water works, etc. Roadwork zones may also be found when a major accident occurs and road debris from the accident needs to be cleared. Such roadwork zones are indicated to users of vehicles or autonomous vehicles using road signs, such as, "construction site" sign, "workers on the road" sign, "construction in progress", sign, "DANGER Roadwork" sign, "roadwork ahead" sign etc., or temporary signs such as traffic cones, barrier boards, etc. In some countries, the roadwork zones are indicated to the users of vehicles or autonomous vehicles using lane markings from a distance of the roadwork zone and speed limit signs from a distance of the roadwork zone. However, detection of the extent of the roadwork zones is subject to visibility, weather and lighting conditions, etc. Some vehicles may miss the lane markings while navigating through the roadwork zones as other vehicles may be obstructing the view or the lane markings may be occluded by water, mud, or snow. Information related to connectivity of roads through the roadwork zones may be missing or unordered due to discrete observations of the lane markings or the road signs from a plurality of vehicles. Accordingly, there is a need for deriving at least one route through a roadwork zone based on the discrete observations of the lane markings or the road signs for vehicles to safely navigate through the identified roadwork zone, even under reduced visibility conditions.

BRIEF SUMMARY

Vehicles on a road, typically, rely on map databases that contain information regarding road geometry, lane geometry, road link connectivity, road type, etc. The information in the map databases may be enriched with data sources that provide traffic data, weather related data, and information related to road maintenance. A plurality of sensors, installed onboard the vehicles may provide information related to roadwork zones to augment the content of the map databases or remote map data providers, alert the user of the vehicles of a hazardous condition or even provide input for controlling the vehicle in an autonomous or semi-autonomous manner. Detection of the roadwork zones is essential for navigation of vehicles and providing environmental awareness for vehicle safety has been a primary concern for automobile manufacturers and related service providers. However, the detection of the roadwork zones is subject to visibility, weather, and lighting conditions. The vehicles may fail to detect a roadwork zone due to sunlight being reflected in a particular manner at a time in a day or the lane markings may be occluded by water, mud, or snow. Moreover, the roadwork detection relies on point-based discrete observations of the road features, such as, road signs, lane markings, physical dividers (e.g. guardrails, bollards, cones, etc.) by the vehicles and the discrete observations may provide an incomplete assessment of a route through the roadwork zone. It would be advantageous to generate a route through the roadwork zone enroute a destination for safety of the vehicles and personnel working at the roadwork zone.

A method, a system, and a computer program product are provided in accordance with an example embodiment described herein for generating route data of one or more routes through an area, may be a roadwork zone.

Embodiments disclosed herein may provide a method for generating route data of the routes through an area. The method includes: obtaining from a map database, by a processor, a plurality of map-matched links corresponding to the area, determining one or more first links and one or more second links from the plurality of map-matched links based on relationships between the plurality of map-matched links, and searching the map database by the processor, in the downstream of the first link, for one or more missing downstream links based on one or more link attributes of each of the one or more first links and a downstream distance threshold. The method further includes: searching in the map database by the processor, in the upstream of the second link, for one or more missing upstream links based on one or more link attributes of each of the one or more second links and an upstream distance threshold and generating the route data of the route based on the one or more first link, the second link, the missing downstream links, the missing upstream links, and the plurality of map-matched links.

The plurality of map-matched links correspond to a first plurality of point-based road feature observations associated with a plurality of sensor observations made by a plurality of vehicles, at least a third link of the plurality of map-matched links is in upstream of the first link, and at least a fourth link of the plurality of map-matched links is in downstream the second link.

Generating the route data includes identifying at least one start link from one of the one or more second links or the missing upstream links and identifying at least one end link from one of the one or more first links or the missing downstream links. The route data comprises location data and heading data of each of the at least one start link and the at least one end link. The link attributes of each of the one or more first links comprise one or more of a functional class of the first link, a link start location and a link end location of the first link, a link downstream heading of the first link, and length of the first link. The link attributes of each of the one or more second links comprise one or more of a functional class of the second link, a link start location and a link end location of the second link, a link upstream heading of the second link, and length of the second link. Furthermore, obtaining the plurality of map-matched links includes: clustering the first plurality of point-based road feature observations, based on an observation type, a location and a heading of each of the first plurality point-based road feature observations to generate at least one cluster; and map-matching the generated at least one cluster to a plurality of links based on the observation type, the location, and the heading of point-based road feature observation in the generated at least one cluster, to obtain the plurality of map-matched links. The method further includes outputting a traversable route on an output interface of one or more vehicles, based on the generated route data.

In an example embodiment, a system for generating route data of one or more routes through an area is provided. The system may include at least one non-transitory memory configured to store computer program code instructions, and at least one processor configured to execute the computer program code instructions to at least: obtain from a map database, a plurality of map-matched links corresponding to the area, determine one or more first links and one or more second links from the plurality of map-matched links based on relationships between the plurality of map-matched links, search the map database, in the downstream of the first link, for one or more missing downstream links based on one or more link attributes of each of the one or more first links and a downstream distance threshold, search the map database in the upstream of the second link, for one or more missing upstream links based on one or more link attributes of each of the one or more second links and an upstream distance threshold, and generate the route data of the route based on the one or more first links, the one or more second links, the missing downstream links, the missing upstream links, and the plurality of map-matched links. The processor is further configured to identify at least one start link from one of the one or more second links or the missing upstream links; and identify at least one end link from one of the one or more first links or the missing downstream links. The processor is further configured to cluster the first plurality of point-based road feature observations, based on an observation type, a location and a heading of each of the first plurality of point-based road feature observations to generate at least one cluster and map-match the generated at least one cluster to a plurality of links based on the observation type, the location, and the heading of each point-based road feature observation in the generated at least one cluster, to obtain the plurality map-matched links. The processor is optionally configured to output a traversable route on an output interface of one or more vehicles, based on the generated route data.

Embodiments of the present invention may provide a computer program product including at least one non-transitory computer-readable storage medium having computer-executable program code instructions stored therein. The computer-executable program code instructions when executed by a computer, cause the computer to carry out operations generating route data of one or more routes through an area, the operations including: obtaining from a map database, a plurality of map-matched links corresponding to the area, determining one or more first links and one or more second links from the plurality of map-matched links based on relationships between the plurality of map-matched links, searching the map database, in the downstream of the first link, for one or more missing downstream links based on one or more link attributes of each of the one or more first links and a downstream distance threshold, searching the map database, in the upstream of the second link, for one or more missing upstream links based on one or more link attributes of each of the one or more second links and an upstream distance threshold, generating the route data of the route based on the one or more first links, the one or more second links, the missing downstream links, the missing upstream links, and the plurality of map-matched links. For generating the route data, the operations further include identifying at least one start link from one of the one or more second links or the missing upstream links and identifying at least one end link from one of the one or more first links or the missing downstream links. For obtaining the plurality of map-matched links, the operations further include: clustering the first plurality of point-based road feature observations, based on an observation type, a location, and a heading of each of the first plurality of point-based road feature observations to generate at least one cluster and map-matching the generated at least one cluster to a plurality of links based on the observation type, the location, and the heading of point-based road feature observation in the generated at least one cluster, to obtain the plurality of map-matched links.

BRIEF DESCRIPTION OF THE DRAWINGS

Figure 1:
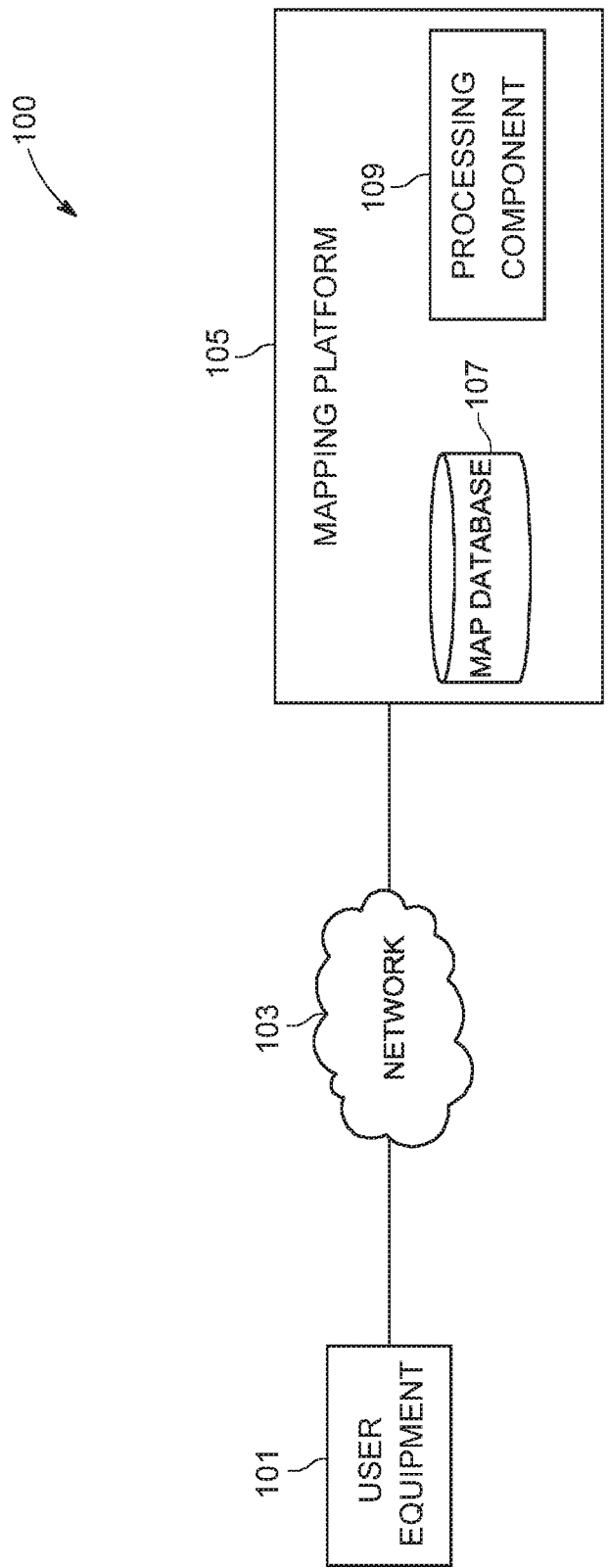
Figure 2:
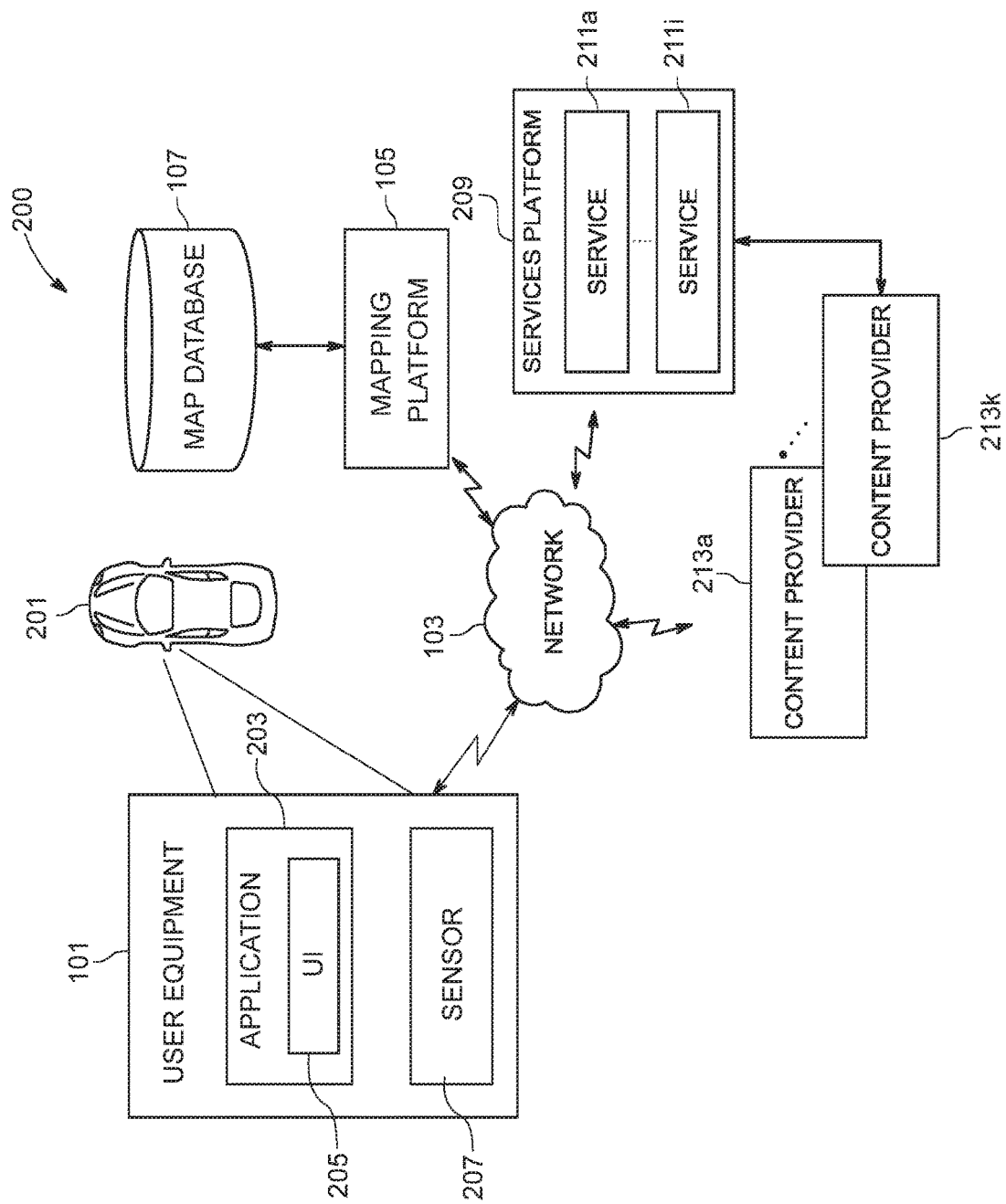
Figure 3:
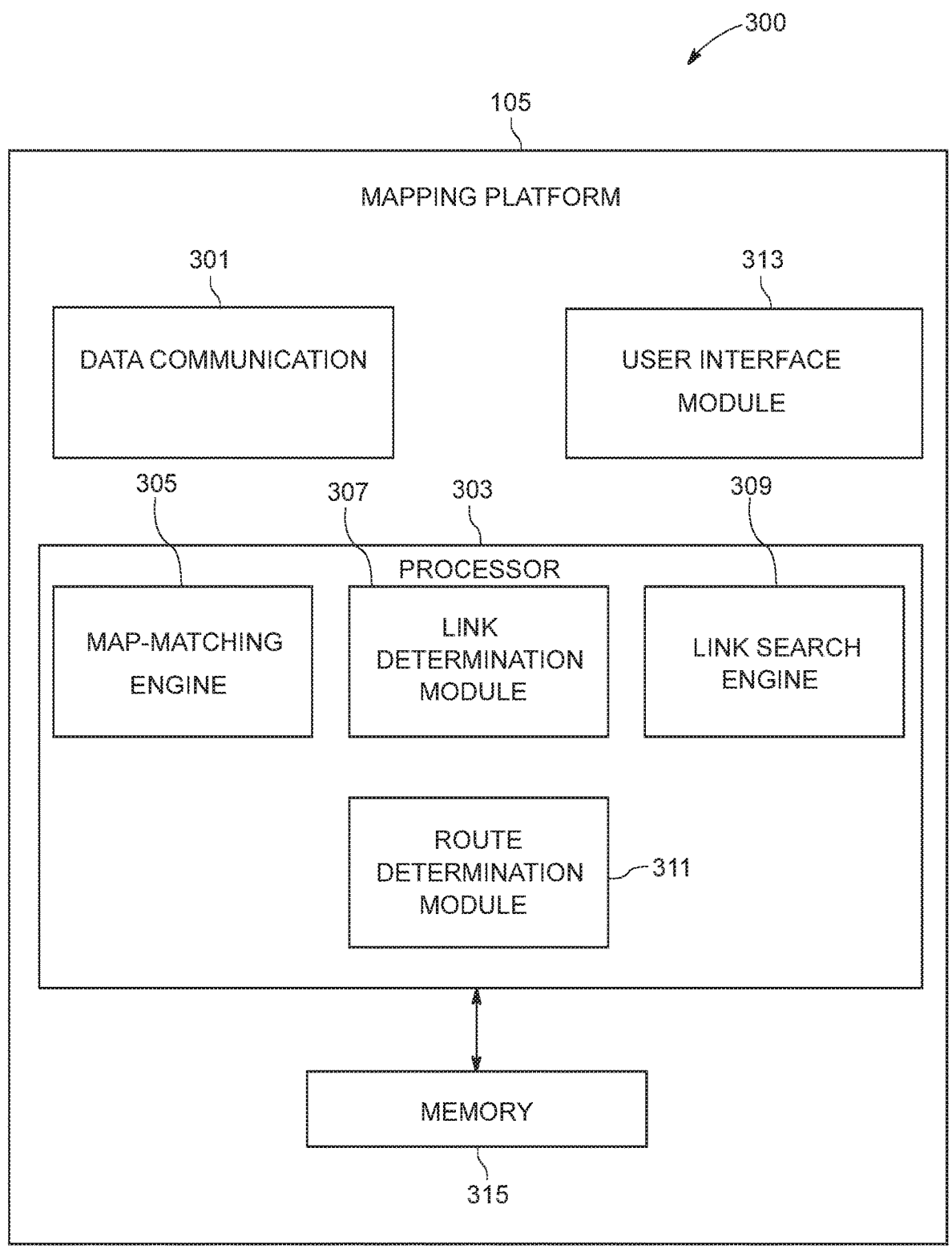
Figure 4:
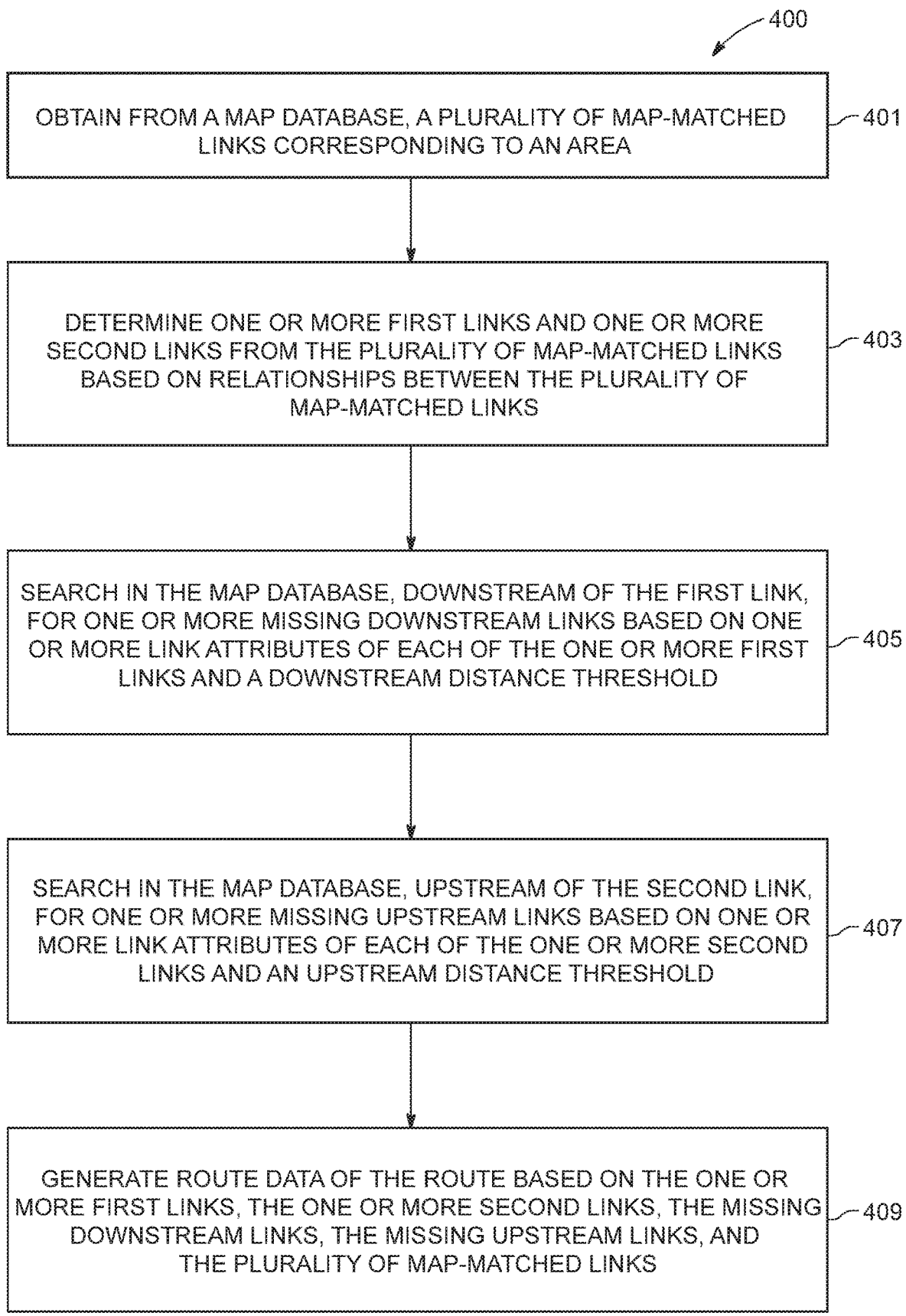
Figure 5:
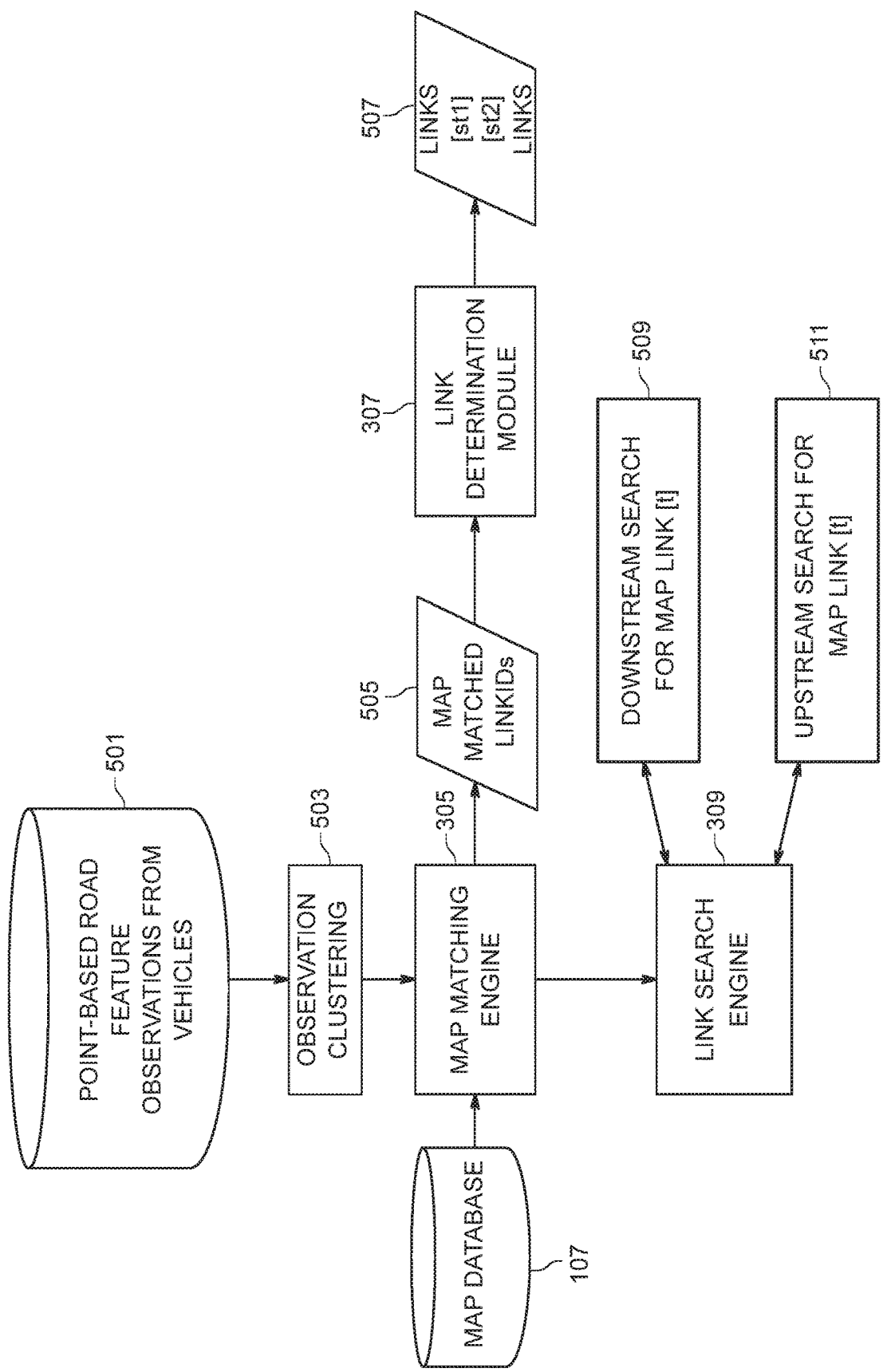

Having thus described example embodiments of the invention in general terms, reference will now be made to the accompanying drawings, which are not necessarily drawn to scale, and wherein:

FIG. 1 illustrates a schematic diagram of a system for generating route data of one or more routes through an area, in accordance with an example embodiment;

FIG. 2 illustrates a block diagram of one embodiment of a system for generating route data of one or more routes through an area, in accordance with an example embodiment;

FIG. 3 illustrates a block diagram of a mapping platform exemplarily illustrated in FIG. 2 that may be used to generate route data of one or more routes through an area, in accordance with an example embodiment;

FIG. 4 illustrates a method for generating route data of one or more routes through an area, in accordance with an example embodiment;

FIG. 5 illustrates a flowchart comprising steps for generating route data of one or more routes through an area, based on interactions between different modules of the mapping platform, as identified in FIG. 3.

Figure 6A:
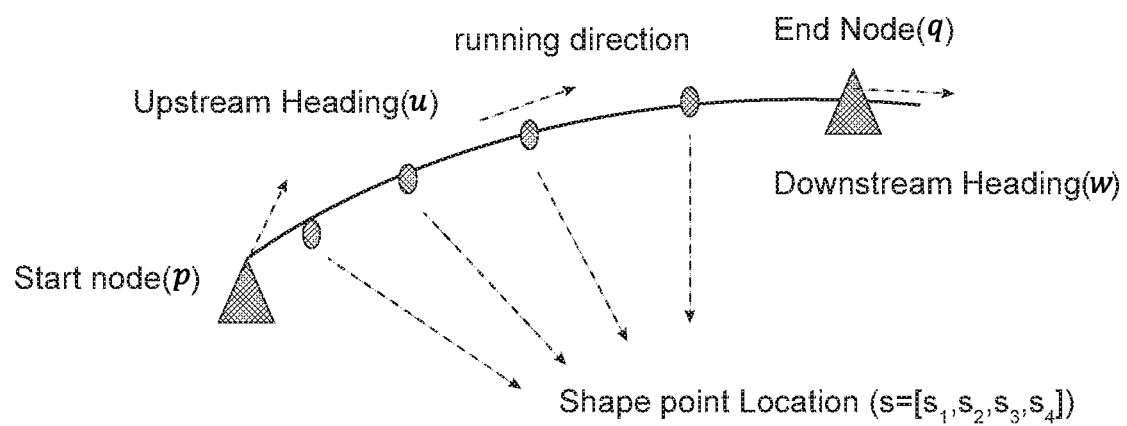
Figures 7A, 7B:
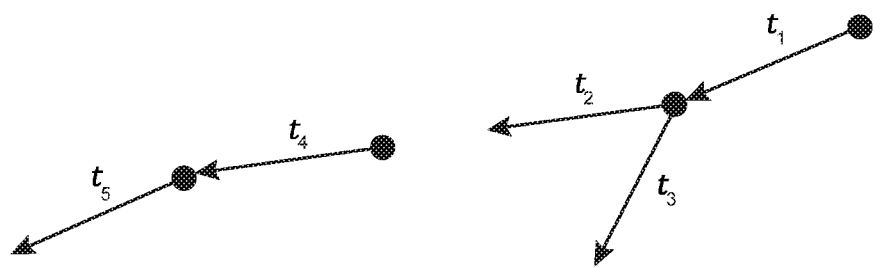
Figure 8A:
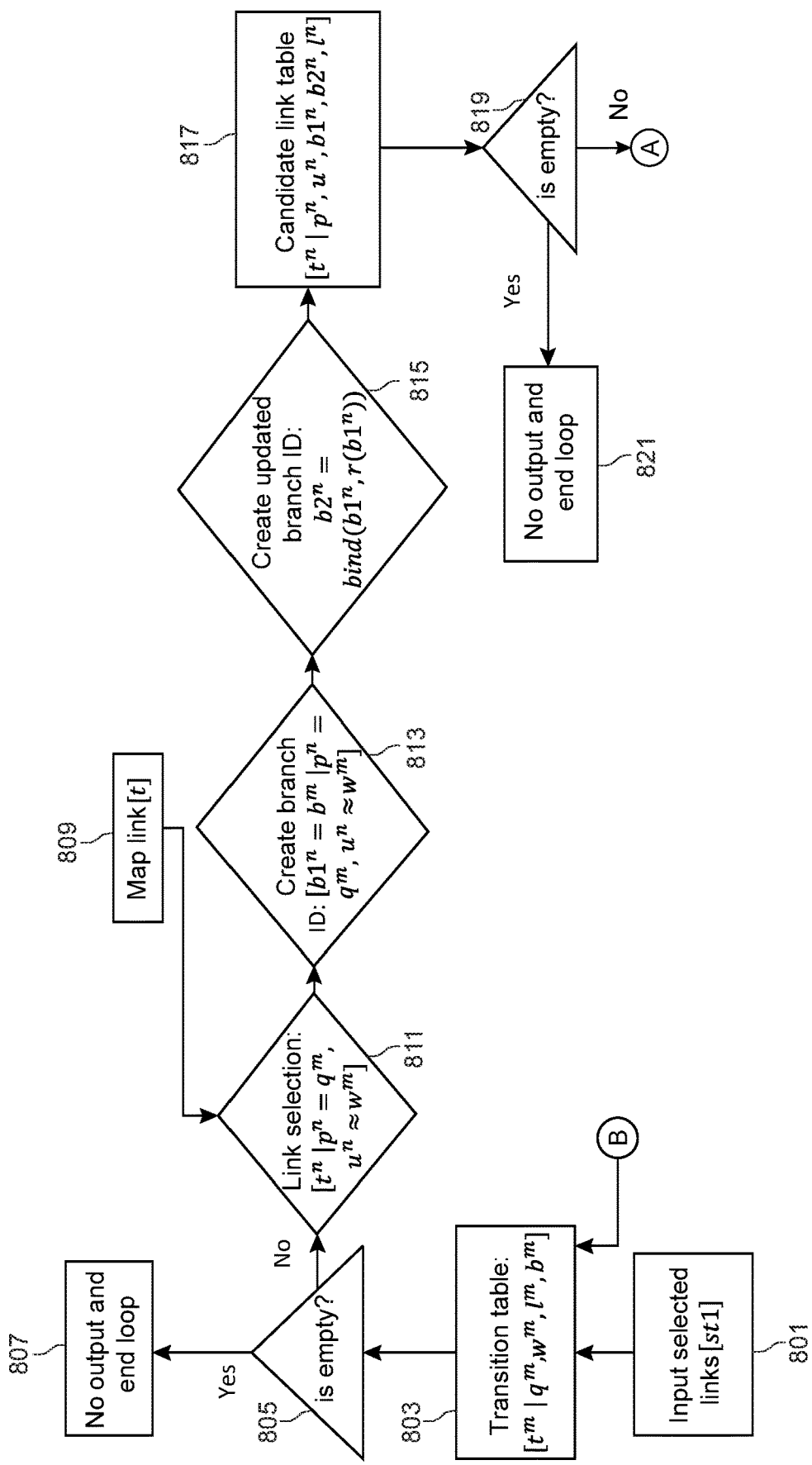
Figure 8B:
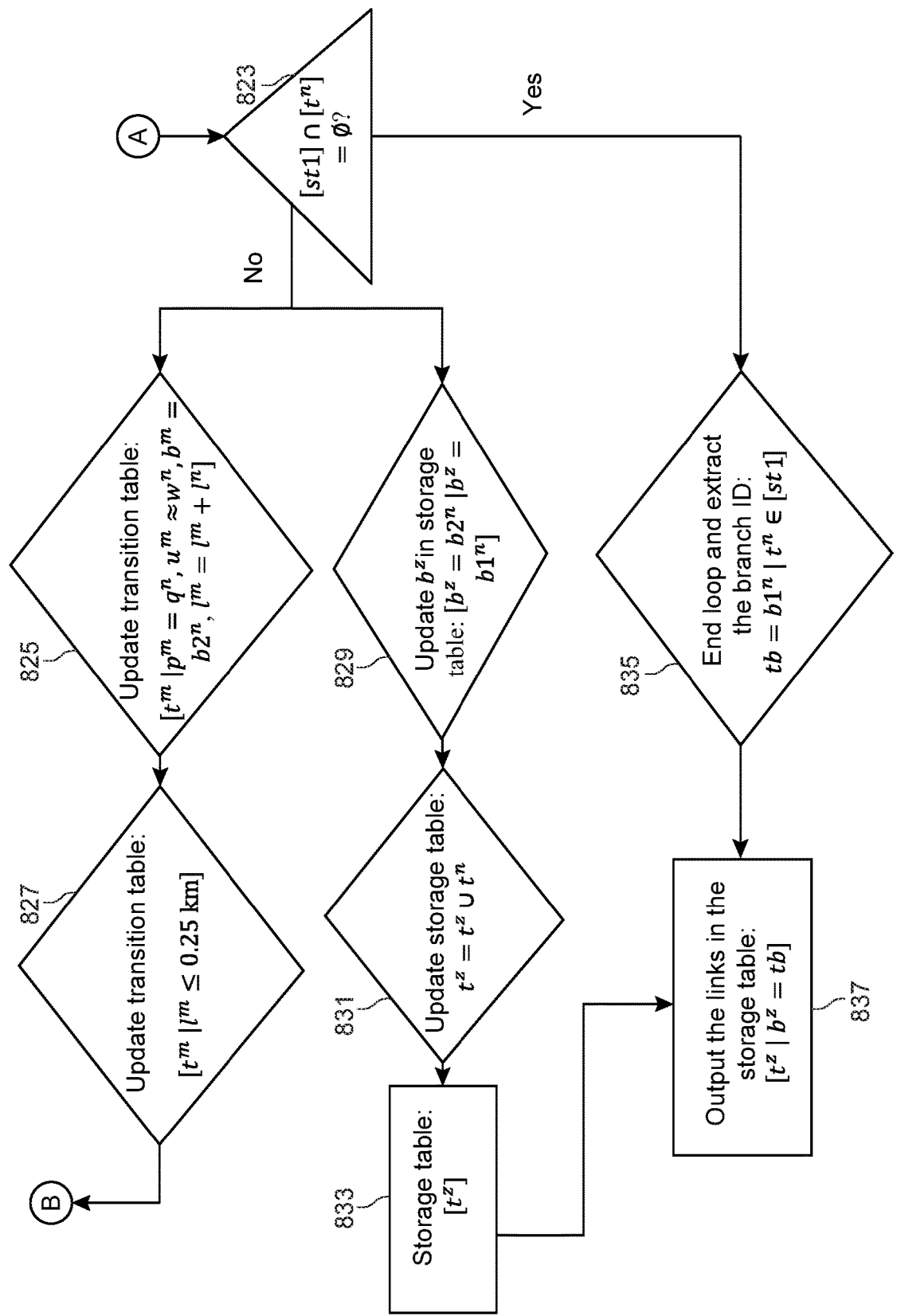
Figure 9A:
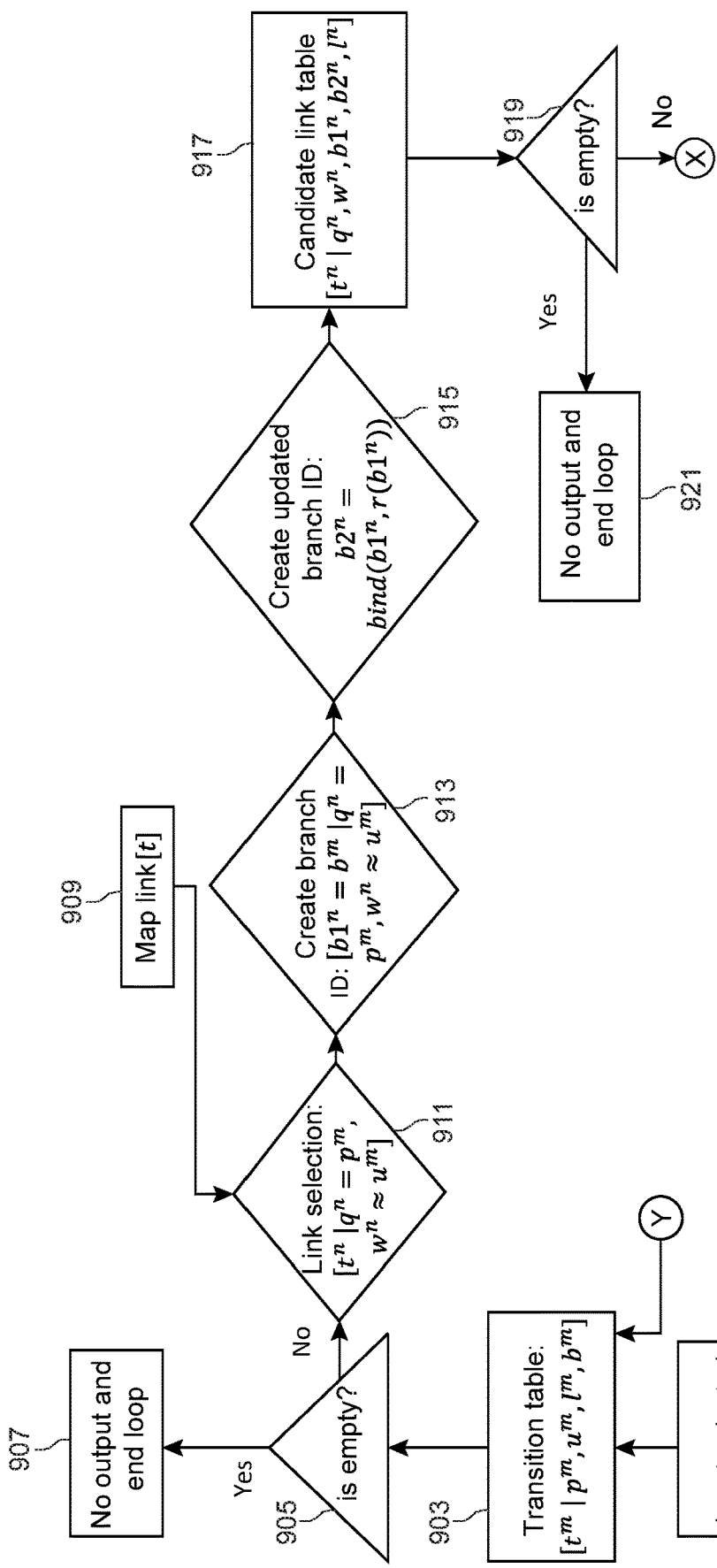
Figure 9B:
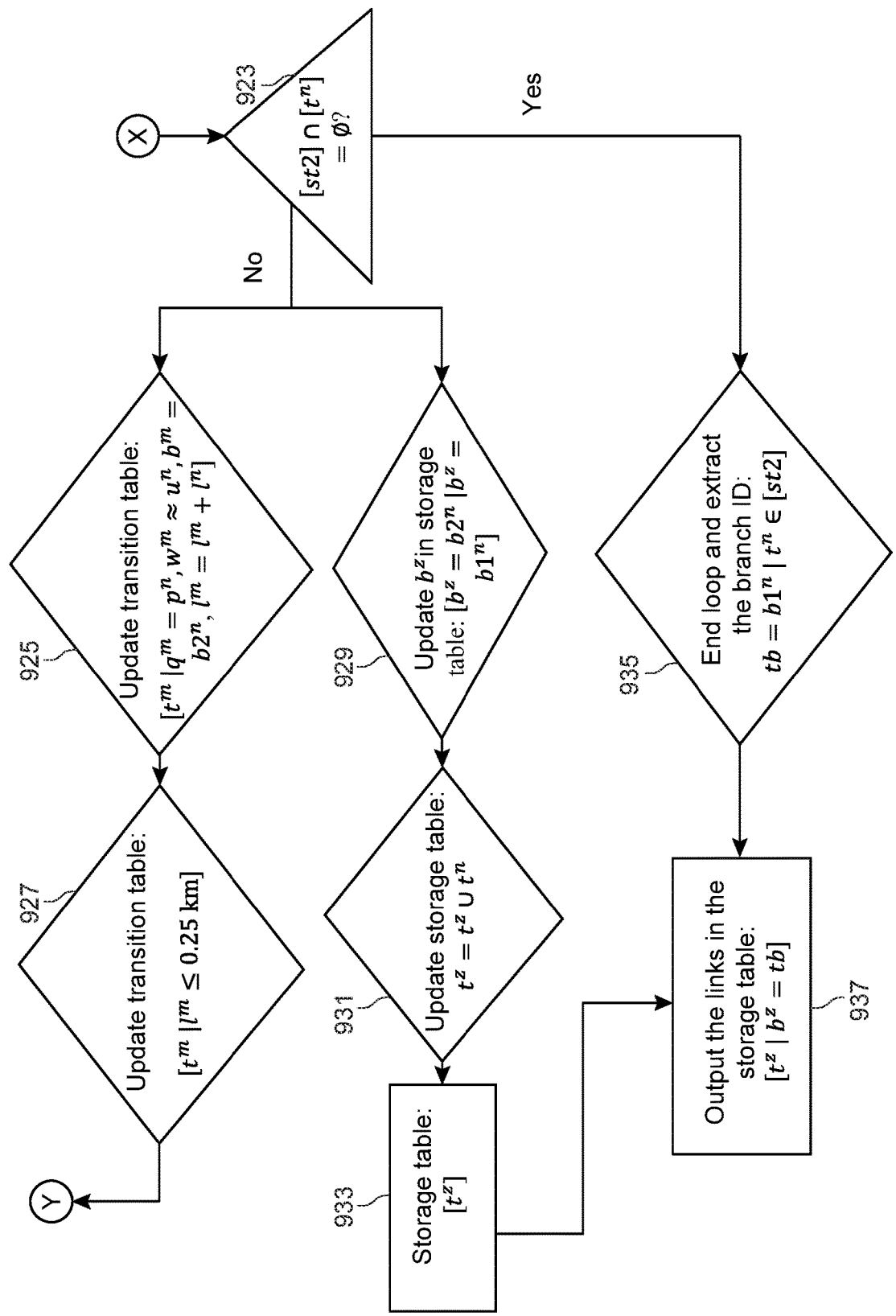

FIGS. 6A-6B illustrate schematic diagrams showing link attributes of a map-matched link constituting a route, in accordance with an example embodiment;

FIGS. 7A-7B illustrate schematic diagrams showing map-matched links indicative of one or more routes through an area, in accordance with an example embodiment;

FIGS. 8A-8B illustrate a flowchart showing steps for searching for one or more missing downstream links in the downstream of a first link, in accordance with an example embodiment; and FIGS. 9A-9B illustrate a flowchart showing steps for searching for one or more missing upstream links in the upstream of the second link, in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may be used to refer to any connecting pathway including but not limited to a roadway, a highway, a freeway, an expressway, a lane, a street path, a road, an alley, a controlled access roadway, a free access roadway and the like.

The term "speed funnel" may be used to refer to a group of two or more speed limit signs indicating a change in sign values of speed limit signs from one end of the speed funnel to the other. A speed funnel may be used as an indication for a roadwork zone, an upcoming tunnel on a pathway, or a transition from a highway to a ramp.

The term "route" may be used to refer to a path from a source location to a destination location on any link.

End of Definitions

A method, a system, and a computer program product are provided herein in accordance with an example embodiment for generating a route data of one or more routes through an area, may be a roadwork zone. Roadwork zones are temporarily defined by authorities to take up road repair work of a section of the road or an entire road. In such cases, the authorities may merge two lanes of a road, block one or more lanes, or divert a lane to a by-lane, etc. Such road work repairs are indicated to travelers in advance of the actual commencement of the roadwork zone because such merging of the lanes may require reduction in speed of the vehicles to avoid collision or any mishap. The roadwork zones are indicated to the users by means of road signs, such as static or dynamic speed limit signs along the pathway, lane markings, bollards, cones, physical divider, guardrail, etc. The speed limit signs may resemble at least one speed funnel and may usually precede the roadwork zone. Vehicles may detect the speed funnels and the lane markings along a pathway in the vicinity of a roadwork. The detection of the road features, such as, the lane markings, road signs, bollards, cones, physical divider, guardrail, etc., are discrete observations. That is, the detection of the road features by the vehicles are point based observations indicating location co-ordinates of the road features within the area, that is, the roadwork zone. However, vehicles may fail to detect some road features due to environmental conditions, such as, visibility, weather conditions, and lighting conditions, etc., prevailing at the time of detection of the road features.

Failure in detection of some road features by vehicles may be caused, for example, by sunlight being reflected in a particular manner at a time of a day, the lane markings may be occluded by water, mud, or snow, some vehicles may miss the lane markings as other vehicles may be obstructing the view of lane markings. Such discrete observations of the road features, usually in no particular sequence, and sometimes failure in detection of the road features may provide incomplete assessment of the roadwork zone and navigation through the roadwork zone. The present invention addresses the aforesaid problems by providing a method and a system to determine connectivity between the discrete observations to generate one or more routes through an area. Additionally, the present invention provides a method and system to generate route data indicating start and end of the routes through the area.

FIG. 1 illustrates a schematic diagram of a system 100 for generating route data of one or more routes through an area, in accordance with an example embodiment. The system 100 includes a user equipment (UE) or a user device 101, which may be in communication with a mapping platform 105, over a network 103. The network 103 may be wired, wireless, or any combination of wired and wireless communication networks, such as cellular, Wi-Fi, internet, local area networks, or the like. Although a single user equipment 101 is depicted in the FIG. 1, it may be contemplated that the mapping platform 105 may be communicatively coupled with several user equipment. It may further be contemplated that one or more user equipment may serve as data capturing devices while one or more other user equipment may serve as beneficiary devices that receive and utilize output data generated by the system for various applications such as navigation assistance. However, for the sake of simplicity, both functionalities may be explained with reference to a single user equipment such as the user equipment 101.

The user equipment 101 may be a navigation system, that may be configured to provide route guidance and navigation related functions to the user of a vehicle. In some embodiments, the user equipment 101 may be installed in the vehicle and may capture road features, such as, speed limit signs along pathways, lane markings, structural separators, such as a median barrier, a physical divider, bollards, guardrails, etc. The user equipment 101 may also include an image capturing device, such as a camera for capturing the road features. Using the captured road features, the user equipment 101 generates point-based road feature observations. The point-based feature observations may be referred to the discrete feature observations, characterized by the location of capture of the road feature that is specified as a coordinate pair. The point-based feature observations include, road feature type, road feature location, and road feature heading as attributes. The road feature type may be a lane marking, a road sign, a bollard, a cone, a physical divider, a guardrail, etc., road feature location may be given as coordinate pair of (lat, lon), and the road feature heading may be indicated in degrees. The vehicle may also include one or more sensors for generating sensor observations from which the point-based road feature observations are derived. The sensor data constitutes the sensor observations. The road features may be static road signs or variable road signs positioned along the pathways. Sign values of variable road signs may vary based on traffic conditions in the vicinity of the variable road signs, such as, LCD display panels, LED panels, etc. The user equipment 101 or the sensors in the vehicle may transmit the generated point-based road feature observations to an OEM cloud sequentially. In an embodiment, the point-based road feature observations may be scheduled to be transmitted to the OEM cloud in batches.

The user equipment 101 may include a mobile computing device such as a laptop computer, tablet computer, mobile phone, smart phone, navigation unit, personal data assistant, watch, camera, or the like. Additionally or alternatively, the user equipment 101 may be a fixed computing device, such as a personal computer, computer workstation, kiosk, office terminal computer or system, or the like. The user equipment 101 may be configured to access the mapping platform 105 via a processing component 109 through, for example, a user interface of a mapping application, such that the user equipment 101 may provide navigational assistance to the user among other services provided through access to the mapping platform 105.

As exemplarily illustrated, the mapping platform 105 may also include a map database 107, which may store node data, road segment data or link data, point of interest (POI) data, posted signs related data or the like. In an embodiment, the map database 107 may be a local replica/copy of an external map database of a map service provider that may be downloaded from the external map database. In some embodiments, the map database 107 may be a cached version of a map database hosted in a cloud. The map database 107 may also include cartographic data, routing data, and/or maneuvering data. According to some example embodiments, the road segment data records may be links or segments representing roads, lanes on roads, streets, or paths, as may be used in calculating a route or recorded route information for determination of one or more personalized routes. The node data may be end points corresponding to the respective links or segments of road segment data. The road link data and the node data may represent a road network, such as used by vehicles, for example, cars, trucks, buses, motorcycles, and/or other entities. Optionally, the map database 107 may contain path segment and node data records or other data that may represent pedestrian paths or areas in addition to or instead of the vehicle road record data, for example. The road/link segments and nodes may be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 107 may include data about the POIs and their respective locations in the POI records.

The map database 107 may additionally include data about places, such as cities, towns, or other communities, and other geographic features such as bodies of water, mountain ranges, etc. Such place or feature data may be part of the POI data or may be associated with POIs or POI data records (such as a data point used for displaying or representing a position of a city). In addition, the map database 107 may include event data (e.g., traffic incidents, construction activities, scheduled events, unscheduled events, etc.) associated with the POI data records or other records of the map database 107 associated with the mapping platform 105. The map database 107 may additionally include data related to an area, the roads in the area, roadwork zones on the roads, such as, location of the roadwork zones, diversions to be caused due to the roadwork zones, suggested routes to avoid congestion to be caused due to the roadwork zones, etc. The data related to the roads may be fetched by the system 100 from external systems, such as, the municipalities. The map database 107 further comprises all the links in the area. The links may include the map-matched links corresponding to the learned road features, the downstream links, and the upstream links whose corresponding point-based road feature observations may not have been captured by the vehicles.

A content provider such as a map developer may maintain the mapping platform 105. By way of example, the map developer may collect geographic data to generate and enhance the mapping platform 105. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Crowdsourcing of geographic map data may also be employed to generate, substantiate, or update map data. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that may inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure. Also, remote sensing, such as aerial or satellite photography, may be used to generate map geometries directly or through machine learning as described herein.

The map database 107 of the mapping platform 105 may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing determination of one or more routes through an area and navigation-related functions and/or services through the area, such as, route calculation, route guidance, map display, speed calculation, distance and travel time functions, and other functions, by a navigation device, such as by the user equipment 101, for example. The navigation-related functions may correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

In some embodiments, the mapping platform 105 may be a master geographic database configured at a server side, but in alternate embodiments, a client side mapping platform may represent a compiled navigation database that may be used in or with end user devices (e.g., user equipment 101) to provide navigation, speed adjustment and/or map-related functions to navigate through roadwork zones. The mapping platform 105 may cluster the point-based road feature observations obtained from a plurality of vehicles and map-match the clusters of the point-based road feature observations on links of a map developed by the map developer. The point-based road feature observations may correspond to start of a boundary of the area, end of the boundary of the area, and route through the area indicating start and end of the area. From the map-matched links, the mapping platform 105 may determine sequence of connections between the map-matched links that represent one or more routes through the area. Furthermore, the mapping platform 105 may generate route data of one or more routes through the area. The mapping platform 105 may be used with the end user device, that is, the user equipment 101 to provide the user with navigation features. In such a case, the mapping platform 105 may be downloaded or stored on the user equipment 101 which may access the mapping platform 105 through a wireless or wired connection, over the network 103.

In one embodiment, the user device or the user equipment 101 may be an in-vehicle navigation system, such as, an infotainment system, an electronic control unit (ECU), an advanced driver assistance system (ADAS), a personal navigation device (PND), a portable navigation device, a cellular telephone, a smart phone, a personal digital assistant (PDA), a watch, a camera, a computer, a workstation, and/or other device that may perform navigation-related functions, such as digital routing and map display. An end user may use the user equipment 101 for navigation and map functions such as guidance and map display, for example, and for determination of one or more personalized routes or route segments based on one or more calculated and recorded routes, according to some example embodiments. In some embodiments, the user of the vehicle may be notified by the mapping platform 105 about location of the roadwork zones and the user may use the user equipment 101, for example, the in-vehicle navigation system for navigation and map functions such as guidance and map display, according to some example embodiments. The user equipment 101 may include an application, for example, a mapping application with a user interface that may enable the user to access the mapping platform 105 for availing the functions disclosed above, such as, for navigating on one or more routes through identified roadwork zones.

FIG. 2 exemplarily illustrates a block diagram of one embodiment of a system 200 for generating route data of one or more routes through an area for navigation of a vehicle 201 through the area using a mapping platform 105. The vehicle 201 may be a user driven vehicle or an autonomous vehicle. An autonomous vehicle, as used throughout this disclosure, may refer to a vehicle having autonomous driving capabilities at least in some conditions. For example, the autonomous vehicle may exhibit autonomous driving on streets and roads having physical dividers between driving lanes. The system 200 includes a user equipment 101, including an application 203 with a user interface 205 for accessing one or more map and navigation related functions. The user equipment 101 may also include one or more sensors 207 such as a camera, a camera array, an acceleration sensor, a gyroscopic sensor, a LIDAR sensor, a proximity sensor, a motion sensor and the like. The sensors 207 may primarily be used for detecting road signs and determining positioning of the vehicle 201 and the sensors 207 may be built-in or embedded into or within interior of the user equipment 101. In some embodiments, the user equipment 101 uses communication signals for position determination. The sensors 207 such as the accelerometer, the gyroscope, and the like can be used to detect the location and heading of the vehicle, enabling a derived location and heading for the detected road feature. The user equipment 101 may receive location data from a positioning system, a Global Navigation Satellite System, such as Global Positioning System (GPS), Galileo, GLONASS, BeiDou, etc., cellular tower location methods, access point communication fingerprinting such as Wi-Fi or Bluetooth based radio maps, or the like. The data collected by the sensors 207 may be used to gather information related to an environment of the vehicle 201, such as, the area. In some embodiments, the vehicle 201 may have sensors positioned on or within and the sensors may provide data indicating a location of the vehicle 201, heading data associated with the road features, types of the road features, sign values of the road signs along pathways approaching the area roadwork zone, and any other kinds of lane markings indicating a roadwork zone that is approaching. The data collected by the sensors may be transmitted to the OEM cloud. Vehicle data, also referred to herein as "probe data", may be collected by any device capable of determining the necessary information, and providing the necessary information to a remote entity. The user equipment 101 is one example of a device that may function as a probe to collect probe data of a vehicle 201.

More specifically, probe data collected by the user equipment 101 may be representative of the location of a vehicle 201 at a respective point in time and may be collected while a vehicle 201 is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GNSS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The user equipment 101, may be any device capable of collecting the aforementioned probe data. In one example, using the sensor data from the user equipment 101, a mapping platform 105 similar to the mapping platform exemplarily illustrated in FIG. 1, may generate route data of one or more routes through an area to assist the vehicle 201 to navigate through the area. The sensor data generated by the sensors 207 may constitute point-based road feature observations. That is, the sensors 207 installed in a plurality of vehicles, such as, 201 or the user equipment may capture road features, such as, speed limit signs, lane markings of different colors, along the pathway and capture the location of the road feature, type of the road feature, value of the road feature, heading at the location of the road feature, and time stamp associated with the time of capture of the road feature. The captured location of the road feature, type of the road feature, value of the road feature, heading at the location of the road feature, and time stamp associated with the capture of the road feature constitute the point-based road feature observations. The processing of the point-based road feature observations to generate a plurality of map-matched links and processing the plurality of map-matched links to identify a start link and an end link of the area from the map-matched links to generate a route through the area is performed by the processor 303, exemplarily illustrated in FIG. 3, same as a processing component 109 exemplarily illustrated in FIG. 1, in the mapping platform 105 exemplarily illustrated in FIG. 3.

The system 200 may further include a services platform 209, which may be used to provide navigation related functions and services 211a-211i to the application 203 running on the user equipment 101. The services 211a-211i may include such as navigation functions, speed adjustment functions, traffic related updates, weather related updates, warnings and alerts, parking related services, indoor mapping services and the like. The services 211a-211i may be provided by a plurality of content providers 213a-213k. In some examples, the content providers 213a-213k may access various SDKs from the services platform 209 for implementing one or more services. In an example, the services platform 209 and the mapping platform 105 may be integrated into a single platform to provide a suite of mapping and navigation related applications for OEM devices, such as the user equipment 101. The user equipment 101 may be configured to interface with the services platform 209, the content provider's services 213a-213k, and the mapping platform 105 over a network 103. Thus, the mapping platform 105 and the services platform 209 may enable provision of cloud-based services for the user equipment 101, such as, storing the point-based road feature observations in an OEM cloud in batches or in real-time and retrieving the stored point-based road feature observations for generating a route through the area, as disclosed in the detailed description of FIG. 3, by the plurality of vehicles, such as, 201 carrying the user equipment 101.

FIG. 3 illustrates a block diagram of a mapping platform 105 exemplarily illustrated in FIG. 2 that may be used to generate route data of one or more routes through an area, in accordance with an example embodiment of the present invention. In the embodiments described herein, the mapping platform 105 comprises a data communication module 301, a map-matching engine 305, a link determination module 307, a link search engine 309, a route determination module 311, and a user interface module 313. In this embodiment exemplarily illustrated in FIG. 3, the map-matching engine 305, the link determination module 307, the link search engine 309, and the route determination module 311, are embodied within a processor 303. The processor 303 may retrieve computer program code instructions that may be stored in a memory 315 for execution of the computer program code instructions by the modules 305, 307, 309, and 311 of the mapping platform 105. The processor 303 may control the execution of the computer program code instructions by the various modules (viz. 301, 305, 307, 309, and 311) of the mapping platform 105. In one embodiment, the data communication module 301 communicates with the sensors 207 disclosed in the detailed description of FIG. 2 and may receive the sensor data and a first plurality of point-based road feature observations from the sensors 207. In an embodiment, the data communication module 301 may receive the point-based road feature observations from the OEM cloud over the network 103. The first plurality of point-based road feature observations may be from detection of the static road signs, such as speed funnels of speed limit signs, "construction site" sign, "workers on the road" sign, "construction in progress", sign, "DANGER Roadwork" sign, "roadwork ahead" sign, etc., positioned along pathways, The first plurality of point-based road feature observations may be from detection of the digital or dynamic road signs, such as, such as, LED panels, LCD panels, etc., positioned along the pathways. The first plurality of point-based road feature observations may be from detection of lane markings, for example, yellow lane markings, indicating a roadwork zone in countries such as Germany. In some example embodiments, the first plurality of point-based road feature observations may be from detection of a structural separator, such as, a guardrail, a barrier, a median, a physical divider, for safe navigation of the vehicles on roads. The first plurality of point-based road feature observations comprise time of capture of the road feature, such as, lane markings, speed limit sign, structural separator, etc., from vehicles such as, 201 as a time stamp associated with each of the point-based road feature observations. A plurality of vehicles, such as, 201 passing by the location of each of the road features, generate the point-based road feature observations for each of the road features. Thus, each point-based road feature observation may differ from other point-based road feature observations based on location data, heading data, road feature value, and road feature type, and time of capture of the road feature from a vehicle. The data communication module 301 may receive sensor data configured to describe a position of the user equipment 101 installed in the vehicle 201, or a controller of the user equipment 101 may receive the sensor data from the positioning system of the user equipment 101. The location of the road feature may correspond to the location of capture of the road feature from vehicles, such as, 201 and the location of the road feature may constitute the location data in a point-based road feature observation. The location of the point-based road feature observations may include co-ordinates with a latitudinal component and a longitudinal component. Similarly, the heading associated with a road feature may correspond to the heading of the vehicle 201 capturing the road feature and the heading of the road feature may correspond to the heading data in a point-based road feature observation.

The data inputted to the mapping platform 105, for example, the sensor data, etc., may be transformed, processed, and executed upon by the mapping platform 105 to map-match to links in a map database 107 by the map-matching engine 305 as disclosed below. The sensor data from the different sensors 207 installed in the user equipment 101 or the vehicle 201 may be converted to units and ranges compatible with the mapping platform 105, to accurately map-match the point-based road feature observations to links in the map database 107 and search for connectivity between the map-matched links to generate a route through the area.

In some example embodiments, the map-matching engine 305 may generate map-matched links from the first plurality of point-based road feature observations captured by the plurality of vehicles, such as, 201. That is, the map-matching engine 305 may map-match the first plurality of point-based road feature observations to known links in the map database 107. Each of the map-matched links may be identified in the map database 107 using an index LINK_ID. The map-matching engine 305 may cluster the first plurality of point-based road feature observations, based on an observation type, a location, and a heading of each of the first plurality of point-based road feature observations to generate at least one cluster. The map-matching engine 305 may further map-match the generated cluster to a plurality of links in the map database 107 based on the observation type, the location, and the heading of each point-based road feature observation in the generated cluster. In an embodiment, a cluster of point-based road feature observations may be generated by applying spatial clustering methods, such as k-means or DBSCAN by setting pre-determined parameters for location clustering and/or heading clustering. In an embodiment, the map-matching engine 305 may cluster the point-based road feature observations based on at least three of the location data, the heading data, the observation value, and the observation type. The observation type may be the type of the road feature, such as, lane markings, speed limit signs, structural separators, road signs, a bollard, a cone, a road barrier, a guardrail, etc. The map-matching engine 305 may use a clustering algorithm, for example, DBSCAN on the location data to cluster the first plurality of point-based road feature observations with a search radius of, for example, eps=150 meters and minPts=3. The clustering by the map-matching engine 305 may distinguish the first plurality of point-based road feature observations based on the observation value, the observation type, and the map-matched link. In an embodiment, in the k-means clustering method, the learned road features generated from the first plurality of point-based road feature observations are the clustering centroid of the generated cluster. The map-matching engine 305 may map-match the learned road features to known links in the map database 107. In an embodiment, the map-matching engine 305 may cluster the first plurality of point-based road feature observations based on a lateral offset in each of the point-based road feature observations and permanency of the point-based road feature observations. Lateral offset may refer to difference in position of capture of the road feature from the plurality of vehicles, such as, 201 and an actual position of the road feature along the pathway. In an embodiment, the map-matching engine 305 may not distinguish a lateral offset of the road features along a pathway constituting one or more point-based road feature observations in generating map-matched links.

Each of the map-matched links may be associated with a LINK_ID, a link start location, a link end location, a link upstream heading, a link downstream heading, a link shape location, and a link length as exemplarily illustrated in FIGS. 6A-6B. A link start location refers to co-ordinates of position of a start node of a map-matched link. Similarly, a link end location refers to co-ordinates of position of an end node of a map-matched link. A link upstream heading refers to a heading of a link start location measured as a heading of a vector formed by the link start location and a shape location nearest to the link start location. A link downstream heading refers to a heading of a link end location measured as a heading of a vector formed by the link end location and a shape location nearest to the link end location. A link shape location refers to a set of shape locations of the map-matched links excluding the link start location and the link end location. A link length refers to a total length of a map-matched link.

As the first plurality of the point-based road feature observations may be obtained from a plurality of vehicles at different times of a day, the map-matched links generated by the map-matching engine 305 may be unordered, that is, the map-matched links do not have an explicit sequence. The link determination module 307, the link search engine 309, and the route determination module 311 determine connectivity between the unordered map-matched links and also search for map-matched links in the map database 107 in upstream and downstream of the unordered map-matched links to represent one or more routes through an area.

The link determination module 307 may obtain the plurality of unordered map-matched links from the map-matching engine 305 and the link determination module 307 may determine one or more first links and one or more second links from the unordered map-matched links based on link attributes of the unordered map-matched links as disclosed in the detailed description of FIGS. 7A-7B. Each of the one or more first links may have at least one of the map-matched links in upstream and each of the one or more second links may have at least one of the map-matched links in downstream. The link determination module 307 may determine one or more first links and one or more second links on generating a reference matrix exemplarily illustrated in FIG. 7B that defines the relationships between the map-matched links. Each of the one or more first links has no connected map-matched links in the downstream and one or more second links has no map-matched links in the upstream. The link search engine 309 may search in the map database 107, for one or more missing downstream links in the downstream of each of the one or more first links as exemplarily illustrated in FIGS. 8A-8B. Similarly, the link search engine 309 may search in the map database 107, for one or more missing upstream links in the upstream of the one or more second links as exemplarily illustrated in FIGS. 9A-9B. The link search engine 309 validates connectivity between the map-matched links and searches for map-matched links in the map database 107 that can exist in the downstream of each of the one or more first links and in the upstream of each of the one or more second links within a finite threshold distance from a first link and a second link respectively. That is, the link search engine 309 may search for the downstream links based on a functional class, the link start location, the link end location, and the link downstream heading within a downstream distance threshold from the first link. Similarly, the link search engine 309 may search for the upstream links based on a functional class, the link start location, the link end location, and the link upstream heading within an upstream distance threshold from the second link. The link search engine 309 may obtain the downstream distance threshold and the upstream distance threshold as physical distances between the road features along the pathway. The upstream distance threshold and the downstream distance threshold may be equal when searching either in upstream and downstream of the first link and the second link respectively. In an embodiment, the upstream distance threshold and the downstream distance threshold may have different values. The functional class of the map-matched links searched in the map database 107 enables the search for map-matched links with smooth link transitions from the first link and the second link and avoids adding intersecting links in the downstream of the first link and/or upstream of the second link.

The link search engine 309 may store the first link, the downstream links, the second link, and the upstream links in multiple tables in the map database 107. In an embodiment, the link search engine 309 may store the determined downstream links and the determined upstream links that constitute one or more routes through the roadwork zone in a storage table in the map database 107. In the process of searching for the downstream links and the upstream links, the link search engine 309 may store temporary information of the map-matched links in a transition table in the map database. Further, the link search engine 309 may store the searched downstream links or the candidate downstream links and the searched upstream links or the candidate upstream links that are within the downstream distance threshold and the upstream distance threshold of each of the first links and each of the second links in the transition table, in a candidate link table of the map database 107.

The route determination module 311 may generate route data of one or more routes through the area, wherein the downstream links and the upstream links defining the routes are stored in the storage table. The route determination module 311 may generate the route data by identifying at least one start link from one of the one or more second links or one or more missing upstream links and by identifying at least one end link from one or more first links or one or more missing downstream links. The route determination module 311 may identify start links and end links of the routes through the area. The route data of the routes includes location data and heading data of the start links and the end links.

Based on the generated route data of the routes through the roadwork zone, the user interface module 313 may output a traversable route through the area on the user interface 205. The user interface module 313 may output notifications regarding alternative navigation routes through an approaching area on the user interface 205. In an embodiment, the user interface module 313 may render indications of a roadwork zone ahead on the user interface 205. In an embodiment, the user interface module 313 may provide navigation suggestions to the user of the vehicle 201 to avoid the roadwork zone based on destination of the user. The different representations of the navigation suggestions may be in the form of a map with color coded or patterned road links indicating traffic conditions on the route, locations of speed funnels on the route, etc. In some example embodiments, the user interface module 313 may notify the users of the vehicles 201 via the user interface 205 of the user equipment 101 about roadwork zone ahead and navigation routes available through the roadwork zones. In some example embodiments, the user interface module 313 renders the notification about changes in navigation routes due to the roadwork zone ahead and impact of the modified roadwork zones on parking situations, in mobile applications or navigation applications used by the users. The user interface module 313 may be configured to update the rendered recommendations on receiving control instructions from the processor 303.

The processor 303 may be embodied in a number of different ways. For example, the processor 303 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 303 may include one or more processing cores configured to perform independently. A multi-core processor may enable multiprocessing within a single physical package. Additionally or alternatively, the processor 303 may include one or more processors configured in tandem via the bus to enable independent execution of instructions, pipelining and/or multithreading.

Additionally or alternatively, the processor 303 may include one or more processors capable of processing large volumes of workloads and operations to provide support for big data analysis. In an example embodiment, the processor 303 may be in communication with a memory 315 via a bus for passing information among components of the system 200. The memory 315 may be non-transitory and may include, for example, one or more volatile and/or non-volatile memories. In other words, for example, the memory 315 may be an electronic storage device (for example, a computer readable storage medium) comprising gates configured to store data (for example, bits) that may be retrievable by a machine (for example, a computing device like the processor 303). The memory 315 may be configured to store information, data, content, applications, instructions, or the like, for enabling the apparatus to carry out various functions in accordance with an example embodiment of the present invention. For example, the memory 315 could be configured to buffer input data for processing by the processor 303. As exemplarily illustrated in FIG. 3, the memory 315 could be configured to store instructions for execution by the processor 303. As such, whether configured by hardware or software methods, or by a combination thereof, the processor 303 may represent an entity (for example, physically embodied in circuitry) capable of performing operations according to an embodiment of the present invention while configured accordingly. Thus, for example, when the processor 303 is embodied as an ASIC, FPGA or the like, the processor 303 may be specifically configured hardware for conducting the operations described herein. Alternatively, as another example, when the processor 303 is embodied as an executor of software instructions, the instructions may specifically configure the processor 303 to perform the algorithms and/or operations described herein when the instructions are executed. However, in some cases, the processor 303 may be a processor specific device (for example, a mobile terminal or a fixed computing device) configured to employ an embodiment of the present invention by further configuration of the processor 303 by instructions for performing the algorithms and/or operations described herein. The processor 303 may include, among other things, a clock, an arithmetic logic unit (ALU) and logic gates configured to support operation of the processor 303.

In some embodiments, the processor 303 may be configured to provide Internet-of-Things (IoT) related capabilities to users of the system 200 disclosed herein. The IoT related capabilities may in turn be used to provide smart city solutions by providing real time parking updates, big data analysis, and sensor based data collection by using the cloud based mapping platform 105 for providing navigation and parking recommendation services and roadwork zone identification services. In some embodiments, the mapping platform 105 may be configured to provide an environment for development of parking strategy recommendation solutions for navigation systems in accordance with the embodiments disclosed herein. The environment may be accessed using the user interface module 313 of the mapping platform 105 disclosed herein. The user interface module 313 may provide an interface for accessing various features and data stored in the mapping platform 105.

In some embodiments, the mapping platform 105 may be configured to provide a repository of algorithms for implementing a plurality of location based services for navigation systems. For example, the mapping platform 105 may include algorithms related to geocoding, routing (multimodal, intermodal, and unimodal), clustering algorithms, machine learning in location based solutions, natural language processing algorithms, artificial intelligence algorithms, and the like. The data for different modules of the mapping platform 105 may be collected using a plurality of technologies including but not limited to drones, sensors, connected cars, cameras, probes, chipsets and the like. The collected data may be processed by the processor 303 to generate route data of one or more routes through an area, may be a roadwork zone, according to the embodiments disclosed herein. As noted above, the mapping platform 105 may be embodied by the processing component. However, in some embodiments, the mapping platform 105 may be embodied as a chip or chip set. In other words, the mapping platform 105 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The mapping platform 105 may therefore, in some cases, be configured to implement an example embodiment of the present invention on a single "system on a chip." As such, in some cases, a chip or chipset may constitute a means for performing one or more operations for providing the functionalities described herein.

The user interface 205 of the user equipment 101 may in turn be in communication with the processor 303 to provide output to the user and, in some embodiments, to receive an indication of a user input. In some example embodiments, the system 200 may include a user interface 205 that communicates with the processor 303 and displays input and/or output of the mapping platform 105. As such, the user interface 205 may include a display and, in some embodiments, may also include a keyboard, a mouse, a joystick, a touch screen, touch areas, soft keys, one or more microphones, a plurality of speakers, or other input/output mechanisms. In one embodiment, the processor 303 may comprise user interface circuitry configured to control at least some functions of one or more user interface elements such as a display and, in some embodiments, a plurality of speakers, a ringer, one or more microphones and/or the like. The processor 303 and/or user interface circuitry comprising the processor 303 may be configured to control one or more functions of one or more user interface elements through computer program instructions (for example, software and/or firmware) stored on a memory accessible to the processor 303 (for example, memory device 310, and/or the like). In some example embodiments, the processor 303 may be configured to provide a method for generating route data of one or more routes through an area as will be discussed in conjunction with FIG. 4 as below.

FIG. 4 exemplarily illustrates a method 400 for generating route data of one or more routes through an area, in accordance with an example embodiment. It will be understood that each block of the flow diagram of the method 400 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 315 of the mapping platform 105, employing an embodiment of the present invention and executed by a processor 303 of the apparatus. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory 315 that may direct a computer or other programmable apparatus to function in a particular manner, such that the instructions stored in the computer-readable memory 315 produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 400 illustrated by the flow diagram of FIG. 4 for generating route data of one or more routes through an area includes, at 401, obtaining from a map database 107, a plurality of map-matched links corresponding to the area. The plurality of map-matched links correspond to a first plurality of point-based road feature observations associated with a plurality of sensor observations made by a plurality of vehicles. At 403, the method 400 may include determining one or more first links and one or more second links from the plurality of map-matched links based on relationships between the plurality of map-matched links. At least a third link of the plurality of map-matched links is in upstream of each of the one or more first links and at least a fourth link of the plurality of map-matched links is in downstream of each of the one or more second links. At 405, the method 400 may include searching the map database 107, in the downstream of each of the one or more first links, for one or more missing downstream links based on one or more link attributes of each of the one or more first links and a downstream distance threshold and at 407, the method includes searching the map database 107, in the upstream of each of the one or more second links, for one or more missing upstream links based on one or more link attributes of each of the one or more second links and an upstream distance threshold. At 409, the method may further include generating route data of the routes based on the one or more first links, the one or more second links, the missing downstream links, the missing upstream links, and the plurality of map-matched links as disclosed in the detailed description of FIG. 3.

In an example embodiment, a system for performing the method of FIG. 4 above may comprise a processor (e.g. the processor 303) configured to perform some or each of the operations (401-409) described above. The processor may, for example, be configured to perform the operations (401-409) by performing hardware implemented logical functions, executing stored instructions, or executing algorithms for performing each of the operations. Alternatively, the system may comprise means for performing each of the operations described above. In this regard, according to an example embodiment, examples of means for performing operations 401-409 may comprise, for example, the processor 303 and/or a device or circuit for executing instructions or executing an algorithm for processing information as described above.

On implementing the method 400 disclosed herein, the end result generated by the mapping platform 105 is a tangible determination of one or more routes through an area, may be a roadwork zone and determination of corresponding route data. The determination of the route through the area with physical dividers, lane markings, cones, barriers, etc., aids in smooth and well planned navigation of vehicles through the area. The determination of the route through the area prior to navigation of an autonomous vehicle through the area aids the autonomous vehicles in transitioning from an autonomous mode to a manual mode smoothly. In an area, for example, a roadwork zone, operating the autonomous vehicle in the manual mode may be preferred to avoid any undue mishaps or collisions from taking place. In the process of determination of the roadwork zone, the mapping platform 105 overcomes the shortcomings of the point-based road feature observations and failure in detection of some road features by determining connectivity between map-matched links generated from the obtained point-based road feature observations. The determination of the route through the roadwork zone may be based on randomly distributed locations of the road signs, which may be few hundred meters away or a few tens of meters away from each other, captured by the vehicles.

Example embodiments disclosed herein provide an improvement in navigation technology related to areas with physical divider, lane markings, cones, barrier, roadwork zones, etc., as follows: Such areas may have numerous people working with heavy machinery. A roadwork zone may lead to a blockage on the road and may result in diversions or merging of the lanes of the road. A prior determination of a route through a roadwork zone to a vehicle may avoid any accident from taking place at the roadwork zones due to plying vehicles and also saves travel time of users plying via the roadwork zone. Planned navigation of vehicles through the roadwork zone on one of the routes through the road work zone may allow authorities to plan and manage movement of the heavy machinery at the roadwork zone to avoid mishaps. The mapping platform 105 uses point-based road feature observations generated from the vehicles plying via the area and may generate learned road features. The learned road features are map-matched to a link similar to the speed limit signs on a pathway prior to a roadwork zone. The mapping platform 105 may collect sensor data as disclosed in FIG. 2 from the vehicles on a day, obtain the point-based road feature observations from the collected sensor data, and cluster the point-based road feature observations based on location, heading, observation type, and observation value of the road signs on the same day. The collected sensor data may be stored in an OEM cloud and the mapping platform 105 may access the OEM cloud for clustering the point-based road feature observations and storing the clusters in the OEM cloud again. On clustering, the mapping platform 105 removes outliers from the point-based road feature observations to result in only a few learned road features. Thus embodiments of the present invention result in lesser processing thereby leading to low resource utilization for solving a problem deeply rooted in navigation technology, autonomous vehicles, and vehicular safety. The mapping platform 105 searches for upstream links and downstream links of each of the one or more second links and the first links respectively and not in the upstream and the downstream of all the map-matched links. On narrowing the process of searching, the mapping platform 105 results in reducing the cumbersome search process to less resource-intensive search process. The determined routes through the roadwork zones may be stored in the map database 107 to aid in navigation of the vehicles through the area until the physical divider, lane markings, cones, barrier, road work may exist. The determined routes through the area stored in the map database 107 may constitute historic data for the authorities to plan roadwork in the future. The mapping platform 105, in an embodiment, may generate recommendations on different modes of transport preferable to avoid traffic on the determined routes in the area.

FIG. 5 illustrates a flowchart comprising steps for generating route data of one or more routes through an area, based on interactions between the different modules of the mapping platform 105, as identified in FIG. 3. As exemplarily illustrated, at step 501, the point based road feature observations are obtained from sensor observations of a plurality of vehicles and at step 503, the point-based road feature observations are clustered to obtain learned road features. The map-matching engine 305 receives the learned road features and map-matches to the links in the map database 107. The link determination module 307 searches for one or more first links and one or more second links 507 from the unordered map-matched links based on link attributes of the unordered map-matched links as disclosed in the detailed description of FIG. 3. The link search engine 309 may downstream search 509 in the map database 107, for one or more missing downstream links in the downstream of each of the one or more first links and the link search engine 309 may upstream search 511 in the map database 107 for one or more missing upstream links in the upstream of the one or more second links as disclosed in the detailed description of FIG. 3.

FIGS. 6A-6B illustrate schematic diagrams showing link attributes of one of a plurality of map-matched links constituting a route. The mapping platform 105 obtains a plurality of map-matched links, on clustering a first plurality of point-based road feature observations. The map-matched links may be formed from the first plurality of point-based road feature observations in a cluster. Each of the map-matched links has corresponding LINK_ID. As exemplarily illustrated in FIG. 6A, a map-matched link has a start node with link start location p, an end node with link end location q, a link upstream heading u, a link downstream heading w, multiple shape points with corresponding link shape locations $[s_i]$, and a link length l. As exemplarily illustrated in FIG. 6A, the map-matched link has four shape points with corresponding shape locations $s_1$, $s_2$, $s_3$, and $s_4$.

FIGS. 7A-7B illustrate schematic diagrams showing map-matched links indicative of one or more routes through an area, in accordance with an example embodiment. As exemplarily illustrated in FIG. 7A, the mapping platform 105 obtains a plurality of map-matched links, for example, five map-matched links with corresponding LINK_IDs. The five map-matched links have corresponding LINK_IDs: $t_1$, $t_2$, $t_3$, $t_4$, and $t_5$. The five map-matched links $t_1$, $t_2$, $t_3$, $t_4$, and $t_5$ may be connected to each other as exemplarily illustrated in FIG. 7A. Connectivity between the five map-matched links is known and the mapping platform 105 searches for one or more upstream links and one or more downstream links of the five map-matched links to determine one or more routes comprising the five map-matched links, and/or the upstream links, and/or the downstream links. As exemplarily illustrated, the map-matched links $t_2$ and $t_3$ are connected in the downstream of map-matched link $t_1$ and there are no map-matched links in the upstream of the map-matched link $t_1$. Similarly, the map-matched link $t_5$ is connected in the downstream of the map-matched link $t_4$ and there are no map-matched links in the upstream of the map-matched link $t_4$. Based on the available information on connectivity between the map-matched links $t_1$, $t_2$, $t_3$, $t_4$, and $t_5$, the mapping platform 105 generates a reference matrix exemplarily illustrated in FIG. 6B. The reference matrix is a N*N matrix where N is the number of map-matched links between whom connectivity is known. Using the reference matrix for the map-matched links, the mapping platform 105 determines one or more first links and one or more second links. That is, the mapping platform 105 identifies a set of map-matched links with no connected downstream links and a set of map-matched links with no connected upstream links. In the reference matrix, if the map-matched link in a row is connected in upstream to a map-matched link in a column, the mapping platform 105 inputs a value 1 corresponding to an intersection of the map-matched link in the row and the map-matched link in the column. In the reference matrix, if the map-matched link in a row is not connected in upstream to a map-matched link in a column, the mapping platform 105 inputs a value 0 corresponding to an intersection of the map-matched link in the row and the map-matched link in the column. As exemplarily illustrated, the map-matched link $t_1$ is in upstream of the map-matched links $t_2$ and $t_3$, that is, the map-matched links $t_2$ and $t_3$ are in the downstream of $t_1$, the mapping platform 105 inputs a value 1 corresponding to an intersection of the map-matched link $t_1$ in the row and the map-matched link $t_2$ in the column and a value 1 corresponding to an intersection of the map-matched link $t_1$ in the row and the map-matched link $t_3$ in the column. In similar fashion, the mapping platform 105 inputs the values in the reference matrix based on FIG. 7A.

Since the map-matched links $t_2$, $t_3$, and $t_5$ have no downstream links, the values corresponding to the intersection of the map-matched link $t_2$ in the row and the map-matched links $t_1$, $t_3$, $t_4$, and is in the columns is 0. Similarly, the values corresponding to the intersection of the map-matched link $t_3$ in the row and the map-matched links $t_1$, $t_2$, $t_4$, and $t_5$ in the columns is 0 and the values corresponding to the intersection of the map-matched link $t_5$ in the row and the map-matched links $t_1$, $t_2$, $t_3$, and $t_4$, in the columns is 0. Also, the map-matched links $t_1$ and $t_4$ have no upstream links. The mapping platform 105 determines the map-matched links $t_2$, $t_3$, and $t_5$ with no downstream links as a set of first links [st1] and the map-matched links $t_1$ and $t_4$ with no upstream links as a set of second links [st2]. The mapping platform 105 determines a first link whose summation of the values in a row is 0 and a second link whose summation of values in a column is 0. Mathematically, $$[st1] = \left[ t | \sum_{j}^{N} t_{ij} = 0 \right]$$

$$[st2] = \left[ t | \sum_{i}^{N} t_{ij} = 0 \right]$$

where N is the number of map-matched links, and i and j are indices indicating a row and a column in the reference matrix. [st1] and [st2] are the map-matched links with no upstream and downstream links. Even though a given link may not have an upstream link in the detection results of one vehicle, it may find upstream links in results of other vehicles. Thus, the first links in [st1] and the second links in [st2] are determined from point-based road feature observations derived from the sensor observations from multiple vehicles.

The mapping platform 105 further searches for one or more missing downstream links in the downstream of each of the first links in the set of first links [st1] in the map database 107. Similarly, the mapping platform 105 further searches for one or more missing upstream links in the upstream of each of the second links in the set of second links [st2] in the map database 107. The mapping platform 105 validates and records all possible connected links in the upstream and downstream of the second links and the first links respectively with a finite distance threshold. For each of the first links in [st1], the mapping platform 105 searches the missing downstream links as exemplarily illustrated in FIGS. 8A-8B. Furthermore, the mapping platform 105 determines the missing downstream links within a downstream distance threshold, such as 0.25 km, from a first link based on the link attributes of the first link disclosed in the detailed description of FIGS. 6A-6B. Similarly, for each of the second links in [st2], the mapping platform 105 searches for the missing upstream links in the map database 107, as exemplarily illustrated in FIGS. 9A-9B. Furthermore, the mapping platform 105 determines the missing upstream links within an upstream distance threshold, such as 0.25 km, from a second link based on the link attributes of the second link disclosed in the detailed description of FIGS. 6A-6B.

The mapping platform 105 may store the determined downstream links and the determined upstream links of the first links in [st1] and the second links in [st2] in the storage table of the map database 107. The mapping platform 105 stores intermediate information of the map-matched links in the process of searching for the downstream links as exemplarily illustrated in FIGS. 8A-8B and in the process of searching for the upstream links as exemplarily illustrated in FIGS. 9A-9B in the transition table. The intermediate information may be the link attributes of the candidate downstream links and the candidate upstream links that are searched. The mapping platform 105 further stores qualified connected map-matched links in the downstream and upstream of the map-matched links in the transition table in the candidate link table of the map database 107.

FIGS. 8A-8B illustrate flowcharts showing steps for searching for one or more missing downstream links in the downstream of a first link, in accordance with an example embodiment. For each first link in [st1], the mapping platform 105 may search for one or more missing downstream links. The input to the mapping platform 105 is the set of first links [st1] as exemplarily illustrated at step 801. At step 803, in the transition table, the mapping platform 105 initializes a link end location $q^m$, a link downstream heading $w^m$ to the link end location of the first link $q^{st1}$ and the link downstream heading $w^m$ respectively. A value of 0 is assigned to link length $l^m$ and branch ID identifying searched map-matched link $b^m$ may be a number and/or a letter.

The mapping platform 105, at step 805, determines if the transition table is empty. If the transition table is empty, at step 807, the mapping platform 105 may end the search for the downstream links, since there are no first links in the transition table for which downstream links need to be searched. If the transition table is not empty, the mapping platform 105 continues search for one or more downstream links in the downstream of the first link. At step 809, the mapping platform 105 obtains map-matched links [t] from the map database 107. At step 811, the mapping platform 105 determines a candidate map-matched link $t^n$ from [t] whose link start location $p^n$ may be same as the link end location $q^m$ of the first link in the transition table and whose upstream heading $u^n$ may be similar to the downstream heading $w^m$ of the first link. That is, the heading difference between the upstream heading $u^n$ of the candidate map-matched link and the downstream heading $w^m$ of the first link is not larger than 70 degrees. At step 813, the mapping platform 105 creates a branch ID $b1''$ in the transition table for the map-matched link in step 811 and assigns $b1''$ to $b^m$. In the first cycle of execution of the flowchart, the mapping platform identifies the candidate map-matched links $t''$ with branch ID $b1''$ are identified as a downstream links connected to the downstream of the first link in [st1]. The candidate map-matched links $t''$ with branch ID $b1''$ are stored in the storage table. The branch ID in the storage table is updated to the branch ID $b1''$. At step 815, the mapping platform 105 updates the created branch ID $b1''$ to $b2''$ to assign different branch IDs to the candidate map-matched links connected to the same first link, in case there are multiple candidate map-matched links connected in downstream to the same first link. The mapping platform merges the branch ID $b1''$ with a row number of $b1''$ to obtain the new branch ID $b2''$. The new branch ID distinguishes the different tree branches in the storage table in the process of downstream searching and the map-matched links in the same downstream branch of the first link will have the same branch ID. Using the new branch ID $b2''$, the mapping platform 105 may determine if the branch with the new branch ID $b2''$ is one among the set of first links [st1]. If the branch is one among the set of first links [st1], the mapping platform 105 may retrieve all the links in the downstream of the branch with the new branch ID $b2''$ as disclosed further. Also, if the mapping platform 105 finds that the branch is not one among the set of first links [st1] and total link length is larger than a distance threshold, the mapping platform 105 may remove all the links in that branch as will be determined in steps 825 and 827, accordingly. Further at step 817, the mapping platform 105 stores the candidate map-matched links connected in the downstream of the branch ID b $1''$ in the candidate link table with corresponding branch IDs $b1''$, $b2''$, link start location $p''$, link upstream heading $u''$, and link length $l''$. At step 819, the mapping platform 105 determines if the candidate link table is empty. If the candidate link table is empty, the mapping platform 105 ends the process for searching of the downstream links with branch ID $b2''$ at step 821. If the candidate link table is not empty, the mapping platform 105 continues to further determine whether the candidate map-matched links with branch ID $b2''$ are the missing downstream links. At step 823, the mapping platform 105 determines if each of the candidate map-matched links $t''$ is one of the set of first links [st1]. If the candidate map-matched links $t''$ with branch ID $b2''$ are not first links, the mapping platform 105 continues to determine if the candidate map-matched links $t''$ with branch ID $b2''$ are the missing downstream links in the downstream of the branch ID $b1''$. At step 825, the mapping platform 105 updates the transition table with link attributes of the candidate map-matched links $t''$. The candidate map-matched links $t''$ at the downstream of the branch ID $b1''$ have same branch ID $b2''$. The mapping platform 105 initializes the link start location $p^m$ of the candidate map-matched links with branch ID $b2''$ as the link end location $q''$ of the candidate map-matched link $t''$ with branch ID $b1''$, a link upstream heading $u^m$ of the candidate map-matched links with branch ID $b2''$ as the link downstream heading $w''$ of the candidate map-matched link $t''$ with branch ID $b1''$, a branch ID $b^m$ as the branch ID $b2''$ of the candidate map-matched link $t''$, length of the link $l^m$ as total length of the candidate map-matched link $t''$ with branch ID $b1''$ and the length of the candidate map-matched links with branch ID $b2''$ as $l^m+l''$. At step 827, the mapping platform 105 updates the transition table with the link attributes, such as, link start location $p^m$, a link upstream heading $u^m$, a branch ID $b^m$, and total length $l^m$ of the candidate map-matched links to with the branch ID $b^m$ if $l^m$ is less than or equal to a downstream distance threshold, such as, 0.25 km. The downstream distance threshold may be based on an on-route distance and not a Euclidean distance. The on-route distance may be a total physical distance between road signs along pathway. The candidate map-matched links $t''$ with branch ID $b2''$ are identified as a downstream links connected to the downstream of the candidate map-matched link $t''$ with branch ID $b1''$. In 827, transition table will only have the candidate map-matched links whose total length distance is less than a downstream distance threshold and the candidate map-matched links in the transition table will continue to the next cycle. The mapping platform 105 iterates the process of searching from step 803 for further downstream links of the downstream link $t''$ that could be connected in the downstream of the downstream link $t''$ but within 0.25 km from the first link.

Parallelly, at step 829, the mapping platform 105 updates the branch IDs in the storage table with the branch IDs of $b2''$ of the candidate map-matched links $t''$ and further at step 831, the mapping platform 105 updates the storage table by appending the storage table with the candidate link table. At step 833, the storage table comprises the determined downstream links $t^z$ and at step 837, the mapping platform 105 outputs the LINK_IDs of the determined downstream links. If at step 823, the candidate map-matched link is one of the first links in [st1], the mapping platform 105, at step 835, ends the search for the missing downstream links and outputs the LINK_ID of the first link at step 837. The mapping platform 105 iterates the process of searching of the downstream links for each of the other first links in [st1], from step 801.

FIGS. 9A-9B illustrate a flowchart showing steps for searching for one or more missing upstream links in the upstream of a second link, in accordance with an example embodiment. For each second link in [st2], the mapping platform 105 may search for one or more missing upstream links. The input to the mapping platform 105 is the set of second links [st2] as exemplarily illustrated at step 901. At step 903, in the transition table, the mapping platform 105 initializes a link start location $p^m$, a link upstream heading $u^m$ to the link start location of the second link $p^{st2}$ and the link upstream heading $u^{st2}$ respectively. A value of 0 is assigned to link length $l^m$ and branch ID identifying searched map-matched link $b^m$ may be assigned a number and/or a letter.

The mapping platform 105, at step 905, determines if the transition table is empty. If the transition table is empty, at step 907, the mapping platform 105 may end the search for the upstream links, since there are no second links for which upstream links need to be searched. If the transition table is not empty, the mapping platform 105 continues search for one or more upstream links in the upstream of the second link. At step 909, the mapping platform 105 obtains map-matched links [t] from the map database 107. At step 911, the mapping platform 105 determines a candidate map-matched link $t''$ whose link end location $q''$ may be same as the link start location $p^m$ of the second link in the transition table and whose downstream heading $w''$ may be similar to the upstream heading $u^m$ of the second link. That is, the heading difference between the downstream heading $w''$ of the candidate map-matched link $t''$ and the upstream heading $u^m$ of the second link is not larger than 70 degrees. At step 913, the mapping platform 105 creates a branch ID $b1''$ in the transition table for the determined map-matched link in step 911 and assigns b1″ to b‴. In the first cycle of execution of the flowchart, the mapping platform identifies the candidate map-matched links t″ with branch ID b1″ are identified as upstream links connected to the upstream of the second link in [st2]. The candidate map-matched links t″ with branch ID b1″ are stored in the storage table. The branch ID in the storage table is updated to the branch ID b1″. At step 915, the mapping platform 105 updates the created branch ID b1″ to b2″ to assign different branch IDs to the candidate map-matched links connected to the same second link, in case there are multiple candidate map-matched links connected to the same second link. The mapping platform merges the branch ID b1″ with a row number of b1″ to obtain the new branch ID b2″. The new branch ID distinguishes the different tree branches in the storage table in the process of upstream searching and the map-matched links in the same upstream branch of the second link will have the same branch ID. Using the new branch ID b2″, the mapping platform 105 may determine if the branch with the new branch ID b2″ is one among the set of second links [st2]. If the branch is one among the set of first links [st2], the mapping platform 105 may retrieve all the links in the upstream of the branch with the new branch ID b2″ as disclosed further. Also, if the mapping platform 105 finds that the branch is not one among the set of second links [st2] and total link length is larger than a distance threshold, the mapping platform 105 may remove all the links in that branch as will be determined in steps 925 and 927, accordingly. Further at step 917, the mapping platform 105 stores the determined candidate map-matched link t″ connected in the upstream of the branch ID b1″ in the candidate link table with corresponding branch IDs b1″, b2″, link end location q″, link downstream heading w″, and link length l″. At step 919, the mapping platform 105 determines if the candidate link table is empty. If the candidate link table is empty, the mapping platform 105 ends the process for searching of the upstream links with branch ID b2″ at step 921. If the candidate link table is not empty, the mapping platform 105 continues to further determine whether the candidate map-matched links with branch ID b2″ are the missing upstream links. At step 923, the mapping platform 105 determines if each of the candidate map-matched links t″ is one of the set of second links [st2]. If the candidate map-matched links t″ are not second links, the mapping platform 105 continues to determine if the candidate map-matched links t″ with branch ID b2″ are the missing upstream links in the upstream of the branch ID b1″. At step 925, the mapping platform 105 updates the transition table with link attributes of the candidate map-matched links t″. The candidate map-matched links t″ at the upstream of the branch ID b1″ have same branch ID b2″. The mapping platform 105 initializes the link end location q‴ of the candidate map-matched links with branch ID b2″ as the link start location p″ of the candidate map-matched link t″ with branch ID b1″, a link downstream heading w‴ of the candidate map-matched links with branch ID b2″ as the link upstream heading u″ of the candidate map-matched link t″ with branch ID b1″, a branch ID b‴ as the branch ID b2″ of the candidate map-matched link t″, link length l‴ as total length of the candidate map-matched link t″ with branch ID b1″ and the length of the candidate map-matched links with branch ID b2″ as l‴+l″. At step 927, the mapping platform 105 updates the transition table with the link attributes such as, link end location q‴, a link downstream heading w‴, a branch ID b‴, and total length l‴ of the candidate map-matched links to with the branch ID b‴ if l‴ is less than or equal to an upstream distance threshold, such as, 0.25 km. The upstream distance threshold is based on an on-route distance and not a Euclidean distance. The candidate map-matched links t″ with branch ID b2″ are identified as upstream links connected to the upstream of the candidate map-matched link t″ with branch ID b1″. The mapping platform 105 iterates the process of searching from step 903 for further upstream links of the upstream link t″ that could be connected in the upstream of the upstream link t″ but within 0.25 km from the second link.

Parallelly, at step 929, the mapping platform 105 updates the branch IDs in the storage table with the branch IDs of b2″ and further at step 931, the mapping platform 105 updates the storage table by appending the storage table with the candidate link table. At step 933, the storage table comprises the determined upstream links $t^z$ and at step 937, the mapping platform 105 outputs the LINK_IDs of the determined upstream link. If at step 923, the candidate map-matched link is one of the second links in [st2], the mapping platform 105, at step 935, ends the search for the missing upstream links and outputs the LINK_ID of the second link at step 937. The mapping platform 105 iterates the process of searching of the upstream links for each of the other second links in [st2], from step 901.

At the end of the process of searching exemplarily illustrated in FIGS. 8A-8B and FIGS. 9A-9B, the mapping platform 105 stores one or more missing downstream links in the downstream of the first links in [st1] and one or more missing upstream links in the upstream of the second links in [st2] in the storage table of the map database 107. The storage table comprises the sequence of connection between the first links, the missing downstream links, the second links, and the missing upstream links resulting in a route through the area.

The mapping platform 105 further identifies one or more start links and one or more end links amongst the first links, the determined downstream links, the second links, and the determined upstream links stored in the storage table. To identify the start links and the end links, the mapping platform 105 generates a reference matrix similar to the reference matrix exemplarily illustrated in FIG. 7B using the first links, the determined downstream links, the second links, and the determined upstream links stored in the storage table. The mapping platform 105 identifies a start link to be a map-matched link in the reference matrix with no upstream links and an end link to be a map-matched link in the reference matrix with no downstream links. That is, in the reference matrix, the end link is the map-matched link whose summation of intersection of the map-matched link in the row with other map-matched links in the columns is 0. Similarly, the start link is the map-matched link whose summation of intersection of the map-matched link in the column with other map-matched links in the rows is 0. Mathematically, $$[label^e = -1] = \left[t | \sum_{j}^{N} t_{ij} = 0\right]$$

$$[label^s = 1] = \left[t | \sum_{i}^{N} t_{ij} = 0\right]$$

The mapping platform 105 generates route data, that is, location data and heading data of the identified start links and the identified end links. The route data may have all of the necessary links to generate a traversable route, but there may be more than a single traversable route derivable from the route data, and/or the links in the route data may not be ordered in the correct sequence. The mapping platform 105 may derive a traversable route through the area based on the values in the reference matrix of all the upstream links and the downstream links in the storage table. In the reference matrix, if all the values are 1, such upstream links and downstream links form a traversable route. The mapping platform 105 may output the traversable route on the user interface 205.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for generating route data of one or more routes through an area, the method comprising:
    obtaining from a map database, by a processor, a plurality of map-matched links corresponding to the area, wherein the plurality of map-matched links corresponds to a first plurality of point-based road feature observations associated with a plurality of sensor observations made by a plurality of vehicles;
    determining one or more first links and one or more second links from the plurality of map-matched links based on relationships between the plurality of map-matched links,
        wherein at least a third link of the plurality of map-matched links is upstream of each of the one or more first links, and
        wherein at least a fourth link of the plurality of map-matched links is downstream of each of the one or more second links;
    searching the map database by the processor, downstream of each of the one or more first links, for one or more missing downstream links based on one or more link attributes of each of the one or more first links and a downstream distance threshold,
    searching the map database by the processor, upstream of each of the one or more second links, for one or more missing upstream links based on one or more link attributes of each of the one or more second links and an upstream distance threshold, and
    generating the route data of the one or more routes based on the one or more first links, the one or more second links, the one or more missing downstream links, the one or more missing upstream links, and the plurality of map-matched links.

2. The method of claim 1, wherein the generating of the route data comprises:
    identifying at least one start link from one of the one or more second links or the one or more missing upstream links; and
    identifying at least one end link from one of the one or more first links or the one or more missing downstream links.

3. The method of claim 2, wherein the route data comprises location data and heading data of each of the at least one start link and the at least one end link.

4. The method of claim 1, wherein the one or more link attributes of each of the one or more first links comprise one or more of a functional class of a first link, a link start location and a link end location of the first link, a link downstream heading of the first link, and a length of the first link.

5. The method of claim 1, wherein the one or more link attributes of each of the one or more second links comprise one or more of a functional class of a second link, a link start location and a link end location of the second link, a link upstream heading of the second link, and a length of the second link.

6. The method of claim 1, wherein obtaining the plurality of map-matched links comprises:
    clustering the first plurality of point-based road feature observations, based on an observation type, a location and a heading of each of the first plurality of point-based road feature observations to generate at least one cluster; and
    map-matching the generated at least one cluster to a plurality of links based on the observation type, the location and the heading of each point-based road feature observation in the generated at least one cluster, to obtain the plurality of map-matched links.

7. The method of claim 6, wherein the observation type is one of a road marking, a road sign, a bollard, a cone, a road barrier, or a guardrail.

8. The method of claim 1, further comprising outputting a traversable route on an output interface of one or more vehicles based on the generated route data.

9. A system for generating route data of one or more routes through an area, the system comprising:
    at least one memory configured to store computer program code instructions; and
    at least one processor configured to execute the computer program code instructions to:
        obtain from a map database, a plurality of map-matched links corresponding to the area, wherein the plurality of map-matched links corresponds to a first plurality of point-based road feature observations associated with a plurality of sensor observations made by a plurality of vehicles;
        determine one or more first links and one or more second links from the plurality of map-matched links based on relationships between the plurality of map-matched links,
            wherein at least a third link of the plurality of map-matched links is upstream of each of the one or more first links, and
            wherein at least a fourth link of the plurality of map-matched links is downstream of each of the one or more second links;
        search the map database downstream of each of the one or more first links, for one or more missing downstream links based on one or more link attributes of each of the one or more first links and a downstream distance threshold;

search the map database upstream of each of the one or more second links, for one or more missing upstream links based on one or more link attributes of each of the one or more second links and an upstream distance threshold; and generate the route data of the one or more routes based on the one or more first links, the one or more second links, the one or more missing downstream links, the one or more missing upstream links, and the plurality of map-matched links.

10. The system of claim 9, wherein to generate the route data, the at least one processor is further configured to:
   identify at least one start link from one of the one or more second links or the one or more missing upstream links; and
   identify at least one end link from one of the one or more first links or the one or more missing downstream links.

11. The system of claim 10, wherein the route data comprises location data and heading data of each of the at least one start link and the at least one end link.

12. The system of claim 9, wherein the one or more link attributes of each of the one or more first links comprise one or more of a functional class of a first link, a link start location and a link end location of the first link, a link downstream heading of the first link, and a length of the first link.

13. The system of claim 9, wherein the one or more link attributes of each of the one or more second links comprise one or more of a functional class of a second link, a link start location and a link end location of the second link, a link upstream heading of the second link, and a length of the second link.

14. The system of claim 9, wherein to obtain the plurality of map-matched links, the at least one processor is further configured to:
   cluster the first plurality of point-based road feature observations, based on an observation type, a location and a heading of each of the first plurality of point-based road feature observations to generate at least one cluster; and
   map-match the generated at least one cluster to a plurality of links based on the observation type, the location, and the heading of each point-based road feature observation in the generated at least one cluster, to obtain the plurality of map-matched links.

15. The system of claim 14, wherein the observation type is one of a road marking, a road sign, a bollard, a cone, a road barrier or a guardrail.

16. The system of claim 9, wherein the at least one processor is further configured to output a traversable route on an output interface of one or more vehicles, based on the generated route data.

17. A computer program product comprising at least one non-transitory computer-readable storage medium having stored thereon computer-executable program code instructions which, when executed by a computer, cause the computer to carry out operations for generating route data of one or more routes through a roadwork zone, the operations comprising:

obtaining from a map database, a plurality of map-matched links corresponding to the roadwork zone, wherein the plurality of map-matched links corresponds to a first plurality of point-based road feature observations associated with a plurality of sensor observations made by a plurality of vehicles;

determining one or more first links and one or more second links from the plurality of map-matched links based on relationships between the plurality of map-matched links,
   wherein at least a third link of the plurality of map-matched links is upstream of each of the one or more first links, and
   wherein at least a fourth link of the plurality of map-matched links is downstream of each of the one or more second links;

searching the map database downstream of each of the one or more first links, for one or more missing downstream links based on one or more link attributes of each of the one or more first links and a downstream distance threshold;

searching the map database upstream of each of the one or more second links, for one or more missing upstream links based on one or more link attributes of each of the one or more second links and an upstream distance threshold; and generating the route data of the one or more routes based on the one or more first links, the one or more second links, the one or more missing downstream links, the one or more missing upstream links, and the plurality of map-matched links.

18. The computer program product of claim 17, wherein for generating of the route data, the operations comprise:
   identifying at least one start link from one of the one or more second links or the one or more missing upstream links; and
   identifying at least one end link from one of the one or more first links or the one or more missing downstream links.

19. The computer program product of claim 17, wherein for obtaining the plurality of map-matched links, the operations comprise:
   clustering the first plurality of point-based road feature observations, based on an observation type, a location and a heading of each of the first plurality of point-based road feature observations to generate at least one cluster; and
   map-matching the generated at least one cluster to a plurality of links based on the observation type, the location, and the heading of each point-based road feature observation in the generated at least one cluster, to obtain the plurality of map-matched links.

20. The computer program product of claim 17, the operations further comprise outputting a traversable route for output interface of one or more vehicles based on the generated route data.

* * * * *